US011878515B2

(12) United States Patent
Arakane et al.

(10) Patent No.: US 11,878,515 B2
(45) Date of Patent: Jan. 23, 2024

(54) LIQUID DISCHARGE APPARATUS

(71) Applicant: Brother Kogyo Kabushiki Kaisha, Nagoya (JP)

(72) Inventors: Satoru Arakane, Nagoya (JP); Shohei Ichikawa, Niwa (JP); Taichiro Kimoto, Nagoya (JP); Yusuke Arai, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 45 days.

(21) Appl. No.: 17/466,291

(22) Filed: Sep. 3, 2021

(65) Prior Publication Data

US 2022/0063307 A1 Mar. 3, 2022

(30) Foreign Application Priority Data

Sep. 3, 2020 (JP) ................................ 2020-148272

(51) Int. Cl.
*B41J 13/00* (2006.01)

(52) U.S. Cl.
CPC ................................ *B41J 13/0027* (2013.01)

(58) Field of Classification Search
CPC ..... B41J 11/42; B41J 13/0036; B41J 13/0027
See application file for complete search history.

(56) References Cited

U.S. PATENT DOCUMENTS

2010/0141700 A1* 6/2010 Mizutani ................ B41J 11/002 347/16

FOREIGN PATENT DOCUMENTS

| | | |
|---|---|---|
| JP | 2006-096563 | 4/2006 |
| JP | 2006-327028 | 12/2006 |

* cited by examiner

*Primary Examiner* — Justin Seo

(57) ABSTRACT

There is provided a liquid discharge apparatus including: a head, a conveyer having a roller arranged at the downstream of the head according to a conveyance direction, and a controller. The controller is configured to carry out: a recording process, a first determining process to determine whether or not a predetermined time has elapsed since the recording process, a conveying process to convey a medium in if the first determining process determines that the predetermined time has elapsed, and a setting process to set a predetermined time based on a discharge amount of a liquid from a plurality of nozzles onto a recording area and a conveyance time for the conveyer to convey the medium from the recording area to the roller, before the first determining process.

19 Claims, 13 Drawing Sheets

LIQUID DISCHARGE APPARATUS

CROSS REFERENCE TO RELATED APPLICATIONS

The present application claims priority from Japanese Patent Application No. 2020-148272, filed on Sep. 3, 2020, the disclosure of which is incorporated herein by reference in its entirety.

BACKGROUND

The present disclosure relates to a liquid discharge apparatus having a roller arranged at the downstream of a head in a conveyance direction.

There have been publicly known recording apparatus (liquid discharge apparatuses) having a paper discharge driven roller arranged at the downstream of a head in a secondary moving direction (a conveyance direction).

SUMMARY

If the paper discharge driven roller is arranged at the downstream of the head in the conveyance direction, then such a problem may arise that a liquid landed on a recording medium comes to attach to the roller (furthermore, the liquid attached to the roller transfers to the recording medium). If the paper discharge driven roller includes a spur having a plurality of gears on its outer circumference, then the above problem can be constrained to a certain extent. However, if there is a large discharge amount of the liquid or the like, especially, then the above problem cannot be constrained.

An object of the present disclosure is to provide a liquid discharge apparatus capable of constraining the problem that the liquid landed on a medium may attach to the roller arranged at the downstream of the head in the conveyance direction.

According to an aspect of the present disclosure, there is provided a liquid discharge apparatus including: a head including a nozzle surface having a plurality of nozzles; a conveyer configured to convey a medium in a conveyance direction, including a roller located at a downstream of the head in the conveyance direction; and a controller configured to perform: as a recording process, controlling the head to discharge liquid from the plurality of nozzles onto a recording area of the medium; as a first determining process, determining whether or not a predetermined time has elapsed since the recording process; as a conveying process, controlling the conveyer to convey the medium in the conveyance direction in a case that the controller determines that the predetermined time has elapsed in the first determining process; and as a setting process, setting a predetermined time based on a discharge amount of the liquid from the plurality of nozzles onto the recording area of the medium and a conveyance time for the conveyer to convey the medium from the recording area to the roller, before the first determining process.

According to the above aspect, the predetermined time is set based on the discharge amount to the recording area and the conveyance time from the recording area to the roller, and the conveying process is carried out after the predetermined time has elapsed since the recording process. By virtue of this, it is possible to dry the liquid landed on the recording area before the recording area reaches to the roller. By virtue of this, it is possible to prevent the problem of the liquid landed on the medium coming to attach to the roller.

DETAILED DESCRIPTION

First Embodiment

First, referring to FIGS. 1 to 4, an explanation will be made on an overall configuration of a printer 100 according to a first embodiment of the present disclosure, and on a configuration of each part of the printer 100.

Figure 1:
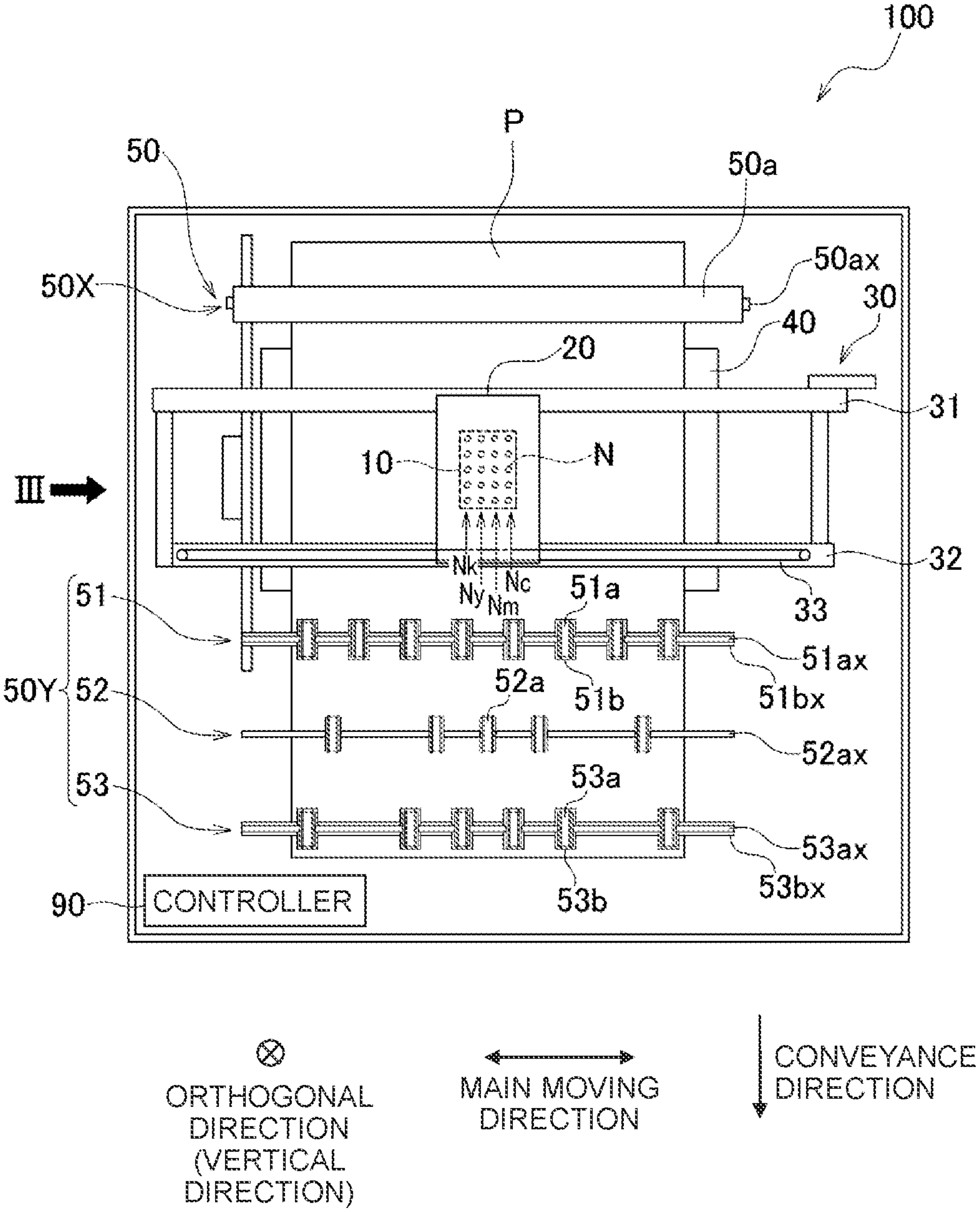
FIG. 1 depicts a plan view showing an overall configuration of a printer.

As depicted in FIG. 1, the printer 100 includes a head 10 formed with a plurality of nozzles N in its lower surface, a carriage 20 holding the head 10, a moving mechanism 30 to move the carriage 20 and the head 10 in a main moving direction (a direction orthogonal to an orthogonal direction that is orthogonal to the nozzle surface 10*x* (see FIG. 2) as described later), a platen 40 to support paper P medium) from below, a conveyer 50 to convey the paper P in a conveyance direction (a direction intersecting with the main moving direction and orthogonal to the orthogonal direction), and a controller 90.

The nozzles N form four nozzle arrays Nc, Nm, Ny, and Nk aligning in the main moving direction. Each of the nozzle arrays Nc, NM, Ny, and Nk is formed from a plurality of nozzles N aligning in the conveyance direction. The nozzles N forming the nozzle array Nc, the nozzles N forming the nozzle array Nm, the nozzles N forming the nozzle array Ny, and the nozzles N forming the nozzle array Nk discharge the ink of cyan, the ink of magenta, the ink of yellow, and the ink of black, respectively.

The moving mechanism 30 includes a pair of guides 31 and 32 supporting the carriage 20, and a belt 33 linked to the carriage 20. The guides 31 and 32 and the belt 33 extend in the main moving direction. If the controller 90 controls a carriage motor 30*m* to drive the same (see FIG. 4), then the belt 33 in motion brings the carriage 20 and the head 10 to move in the main moving direction along the guides 31 and 32.

The platen 40 is arranged below the carriage 20 and the head 10. The paper P is supported on the upper surface of the platen 40.

Figure 3:
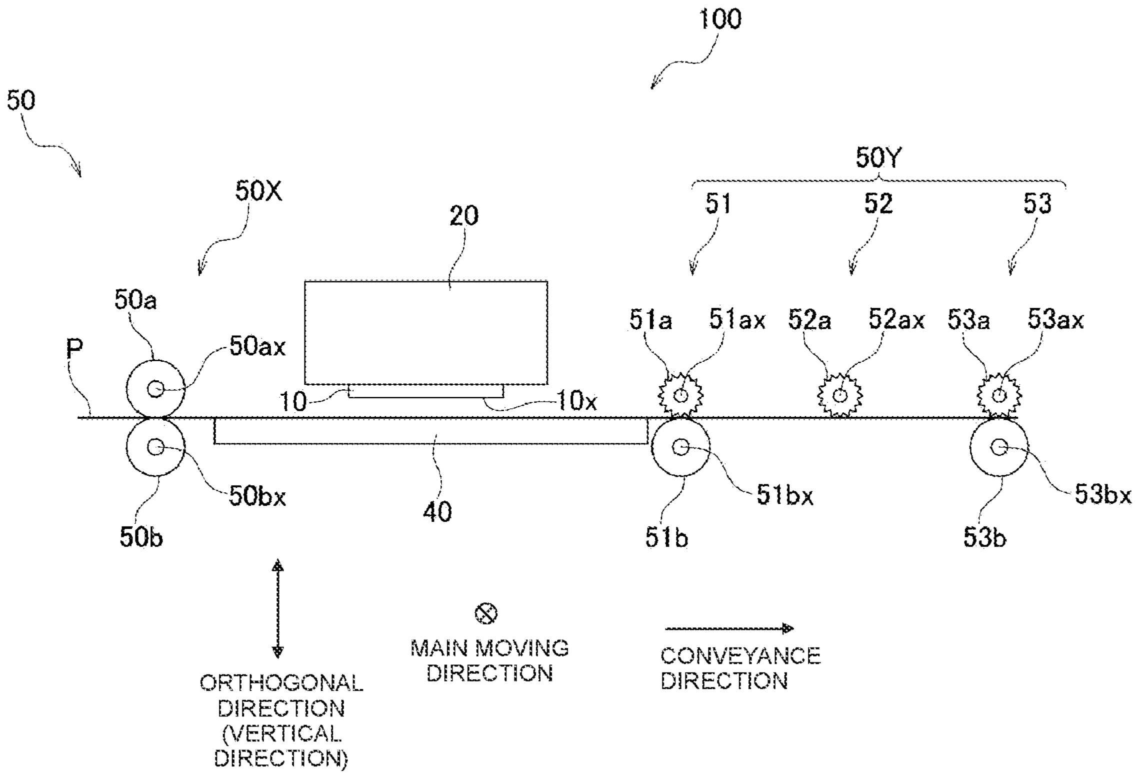
FIG. 3 depicts a side view of the printer of FIG. 1 as viewed from the direction along the arrow III.

The conveyer 50 has, as depicted in FIGS. 1 and 3, an upstream roller unit 50X arranged at the upstream of the head 10 in the conveyance direction, and a downstream roller unit 50Y arranged at the downstream of the head 10 in the conveyance direction. Between the upstream roller unit 50X and the downstream roller unit 50Y in the conveyance direction, the head 10, the carriage 20, and the platen 40 are arranged.

The upstream roller unit 50X includes a roller 50*a* arranged above a conveyance path of the paper P, and a roller 50*b* arranged below the conveyance path of the paper P. The rollers 50*a* and 50*b* are arranged for the circumferential surfaces to contact with each in the orthogonal direction. The rollers 50*a* and 50*b* are both elongated in the main moving direction and supported in a rotatable manner respectively by shafts 50*ax* and 50*bx* extending in the main moving direction.

The downstream roller unit 50Y includes a first roller set 51, a second roller set 52 and a third roller set 53 aligning in the conveyance direction. Among the roller sets 51 to 53, the first roller set 51 is at the uppermost in the conveyance direction, the third roller set 53 is at the lowermost in the conveyance direction. The second roller set 52 is between the first roller set 51 and the second roller set 52 in the conveyance direction.

The first roller set 51 includes eight rollers 51*a* arranged above the conveyance path for the paper P, and eight rollers 51*b* arranged below the conveyance path for the paper P. One roller 51*a* and one roller 51*b* form one roller pair. That is, the first roller set 51 has eight roller pairs. The eight roller pairs align in the main moving direction at equal intervals. In each roller pair, the roller 50*a* and the roller 50*b* are arranged vertically such that their circumferential surfaces may be in contact with each other. The eight rollers 51*a* align in the main moving direction and are supported in a rotatable manner by a shaft 51*ax* extending in the main moving direction. The eight rollers 51*b* align in the main moving direction and are supported in a rotatable manner by a shaft 51*bx* extending in the main moving direction.

The second roller set 52 includes five rollers 52*a* arranged above the conveyance path for the paper P. The five rollers 52*a* align in the main moving direction and are supported in a rotatable manner by a shaft 52*ax* extending in the main moving direction.

The third roller set 53 includes six rollers 53*a* arranged above the conveyance path for the paper P, and six rollers 53*b* arranged below the conveyance path for the paper P. One roller 53*a* and one roller 53*b* form one roller pair. That is, the third roller set 53 has six pairs. In each roller pair, the roller 53*a* and the roller 53*b* are arranged vertically such that their circumferential surfaces may be in contact with each other. The six rollers 53*a* align in the main moving direction and are supported in a rotatable manner by a shaft 53*ax* extending in the main moving direction. The six rollers 53*b* align in the main moving direction and are supported in a rotatable manner by a shaft 53*bx* extending in the main moving, direction.

The six rollers 53*a* of the third roller set 53 are in the same positional level as six ones of the eight rollers 51*a* of the first roller set 51 according to the main moving direction, respectively. The five rollers 52*a* of the second roller set 52 are different in position from any rollers of the first roller set 51 and the third roller set 53 according to the main moving direction.

The controller 90 controls a conveyance motor 50*m* to drive the same (see FIG. 4) such that the upstream roller unit 50X and the downstream roller unit 50Y nip the paper P with the rollers in rotation, thereby conveying the paper P in the conveyance direction.

Note that the rollers 50*a* and 50*b* of the upstream roller unit 50X and the rollers 51*b* and 53*b* of the downstream roller unit 50Y are rubber rollers without projections formed on the outer circumferential surfaces. The rollers 51*a*, 52*a*, and 53*a* of the downstream roller unit 50Y are spur rollers each with a plurality of projections formed on the outer circumferential surfaces. With the rollers 51*a*, 52*a*, and 53*a* being spur rollers, the ink landed on the surface of the paper P becomes less likely to attach to the rollers 51*a*, 52*a*, and 53*a*.

The rollers 51*a*, 52*a*, and 53*a* of the downstream roller unit 50Y correspond to the "roller" of the present disclosure.

Figure 2:
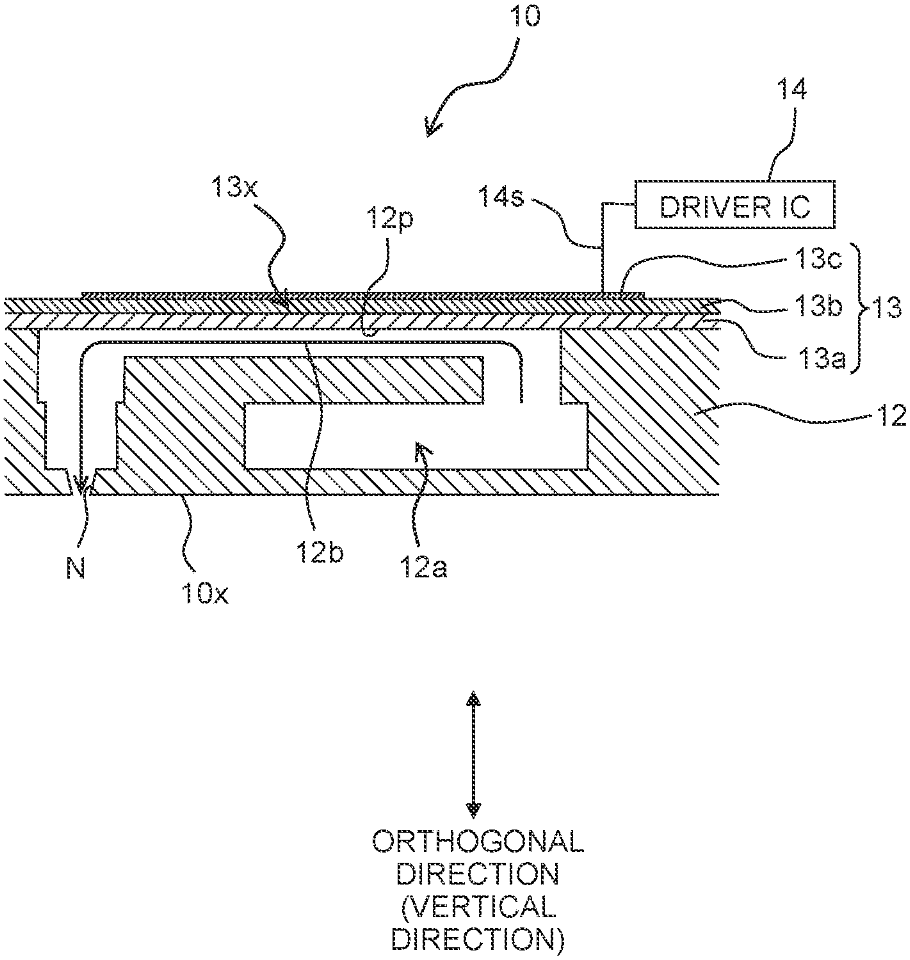
FIG. 2 depicts a cross section view of a head depicted in FIG. 1.

As depicted in FIG. 2, the head 10 includes a flow channel unit 12, and an actuator unit 13.

The plurality of nozzles N (see FIG. 1) are formed in the lower surface of the flow channel unit 12. The lower surface of the flow channel unit 12 corresponds to a nozzle surface 10*x* in which the plurality of nozzles N of the head 10 are opened. The orthogonal direction is orthogonal to the nozzle surface 10*x*. The vertical direction is an example of the "orthogonal direction" of the present disclosure. The main moving direction and the conveyance direction are parallel to the nozzle surface 10*x*.

Inside the flow channel unit 12, there are formed a common flow channel 12*a* in communication with an ink tank (not depicted) and an individual flow channel 12*b* formed individually for each nozzle N. The individual flow channels 12*b* start from the exit of the common flow channel 12*a*, pass through pressure chambers Up, and finally reach the nozzles N. The plurality of pressure chambers 12*p* open in the upper surface of the pressure chambers 12*p*.

The actuator unit 13 includes a metallic vibration plate 13*a* arranged on the upper surface of the flow channel unit 12 to cover the plurality of pressure chambers 12*p*, a piezoelectric layer 13*b* arranged on the upper surface of the vibration plate 13*a*, and a plurality of individual electrodes 13*c* arranged on the upper surface of the piezoelectric layer 13*b* to face the plurality of pressure chambers 12*p* respectively.

The vibration plate 13*a* and the plurality of individual electrodes 13*c* are connected electrically with a driver IC 14. The driver IC 14 keeps the vibration plate 13*a* at the ground potential. The driver IC 14 changes the potential of the individual electrode 13*c*. In particular, the driver IC 14 generates a drive signal based on a control signal from the controller 90 (a waveform signal FIRE and a selection signal SIN), to supply the individual electrodes 13*c* with the drive signal via signal lines 14*s*. By virtue of this, the individual electrodes 13*c* switch between a predetermined drive potential (VDD) and the ground potential (OV). On this occasion, deformation occurs in the part interposed between each individual electrode 13*c* and the corresponding pressure chamber 12*p* (the actuator 13*x*). By virtue of this, the pressure chambers 12*p* change in volume such that a pressure is applied to the ink inside the pressure chambers 12*p* to discharge the ink from the nozzles N. The actuator 13*x* is provided for each individual electrode 13*c* (that is, for each nozzle N). The actuator 13*x* can deform independently according to the potential supplied to individual electrode 13*c*.

Figure 4:
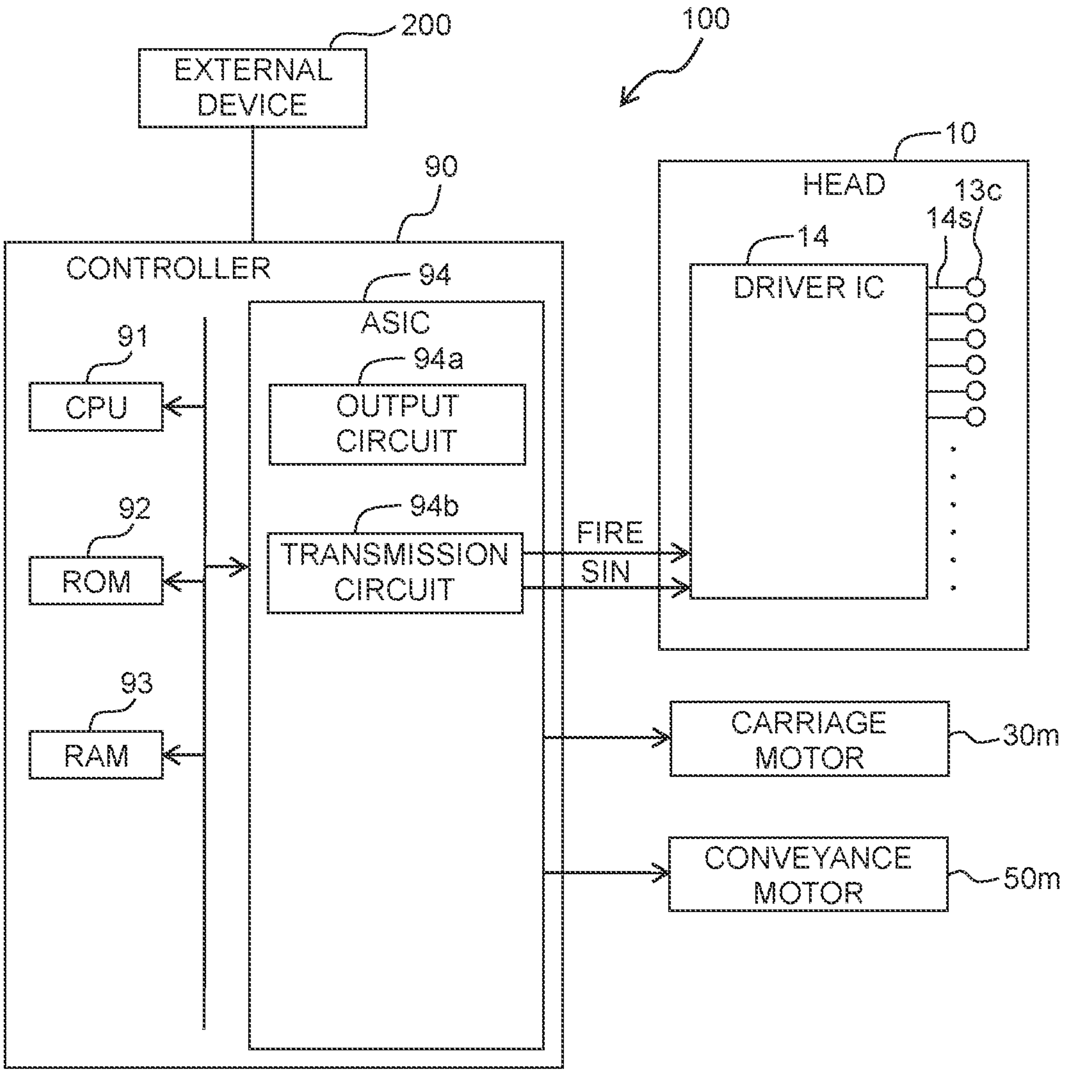
FIG. 4 depicts a block diagram indicating an electrical configuration of the printer of FIG. 1.

The controller 90 includes, as depicted in FIG. 4, a CPU (Central Processing Unit) 91, a ROM (Read Only Memory) 92, a RAM (Random Access Memory) 93, and an ASIC (Application Specific Integrated Circuit) 94, in which the CPU 91 and the ASIC 94 correspond to the "controller" of the present disclosure.

The ROM 92 stores programs and data for the CPU 91 and/or the ASIC 94 to carry out various controls. The RAM 93 temporarily stores data (image data and the like) used for the CPU 91 and the ASIC 94 to execute the programs. The controller 90 is connected with an external device 200 (a personal computer or the like) in a communicable manner and, based on the data inputted from the external device 200 or an input unit of the printer 100 (switches and/or buttons provided on the outer surface of the casing of the printer 100), the CPU 91 or the ASIC 94 carries out a recording process and a conveying process.

As depicted in FIG. 4, the ASIC 94 includes an output circuit 94*a* and a transmission circuit 94*b*.

The output circuit 94*a* generates the waveform signal FIRE and the selection signal SIN and outputs those signals to the transmission circuit 94*b* in each recording period. The recording period is the time needed for the paper P to move relatively to the head 10 through a unit distance corresponding to the resolution of an image formed on the paper P, corresponding to one pixel.

The waveform signal FIRE is a serial signal which has linearly aligned four waveform data. The four waveform data are different from each other in the pulse number and correspond respectively to "zero (no discharge)", "small", "medium", and "large" of the ink droplet amount discharged from the nozzles N over one period.

The selection signal SIN is a serial signal including a selection data for selecting one from the four waveform data and, based on the image data included in a recording command, is generated for each actuator 13*x* and for each recording period.

The transmission circuit 94*b* transmits the waveform signal FIRE and the selection signal SIN received from the output circuit 94*a* to the driver IC 14. The transmission circuit 94*b* includes an inbuilt LVDS (Low Voltage Differential Signaling) driver corresponding to the above respective signals which are transmitted as differential signals in pulse form to the driver IC 14.

The ASIC 94 controls the driver IC 14 in the recording process. The driver IC 14 generates a drive signal based on the waveform signal FIRE and the selection signal SIN for each pixel. Then, the driver IC 14 supplies the drive signal to the individual electrodes 13*c* via the signal lines 14*s*. By virtue of this, the ASIC 94 causes discharges of the ink from the plurality of nozzles N to the paper P, respectively, with the droplet amount selected from the four types (zero, small, medium, and large) of droplet amount for each pixel.

Next, referring to FIG. 5A and FIG. 5B, a program executed by the CPU 91 will be explained. This program is executed after the controller 90 receives the recording command from the external device 200 or the like.

Figure 6:
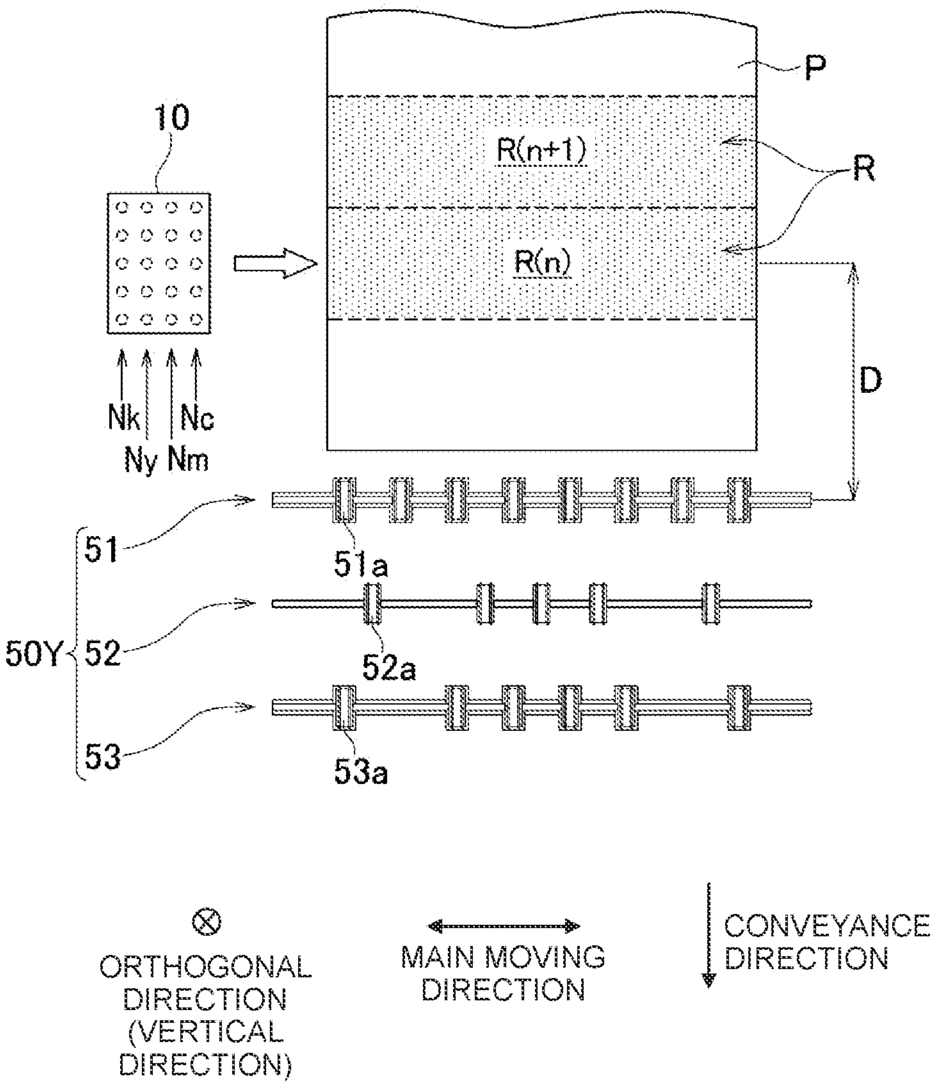
FIG. 6 depicts a schematic view for explaining a setting method for a predetermined time.

The CPU 91 causes the driver IC 14, the carriage motor 30*m* and the conveyance motor 50*m* (see FIG. 4) via the ASIC 94 to drive based on the recording command. By virtue of this, a moving operation (a recording process) and a conveying process are carried out alternately. In the moving operation, the ink is discharged from the nozzles N to a moving area R (see FIG. 6) while moving the carriage 20 and the head 10 in the main moving direction. In the conveying process, the conveyer 50 conveys the paper P through a predetermined distance in the conveyance direction. By virtue of this, dots of the ink are formed on the paper P to record the image.

Each moving area R is a rectangular part of the paper P, extending in the main moving direction to correspond to one moving operation. On the paper P, a plurality of moving areas R align in the conveyance direction. In the first embodiment, the moving areas R correspond to the "recording area" of the present disclosure.

Figure 5A:
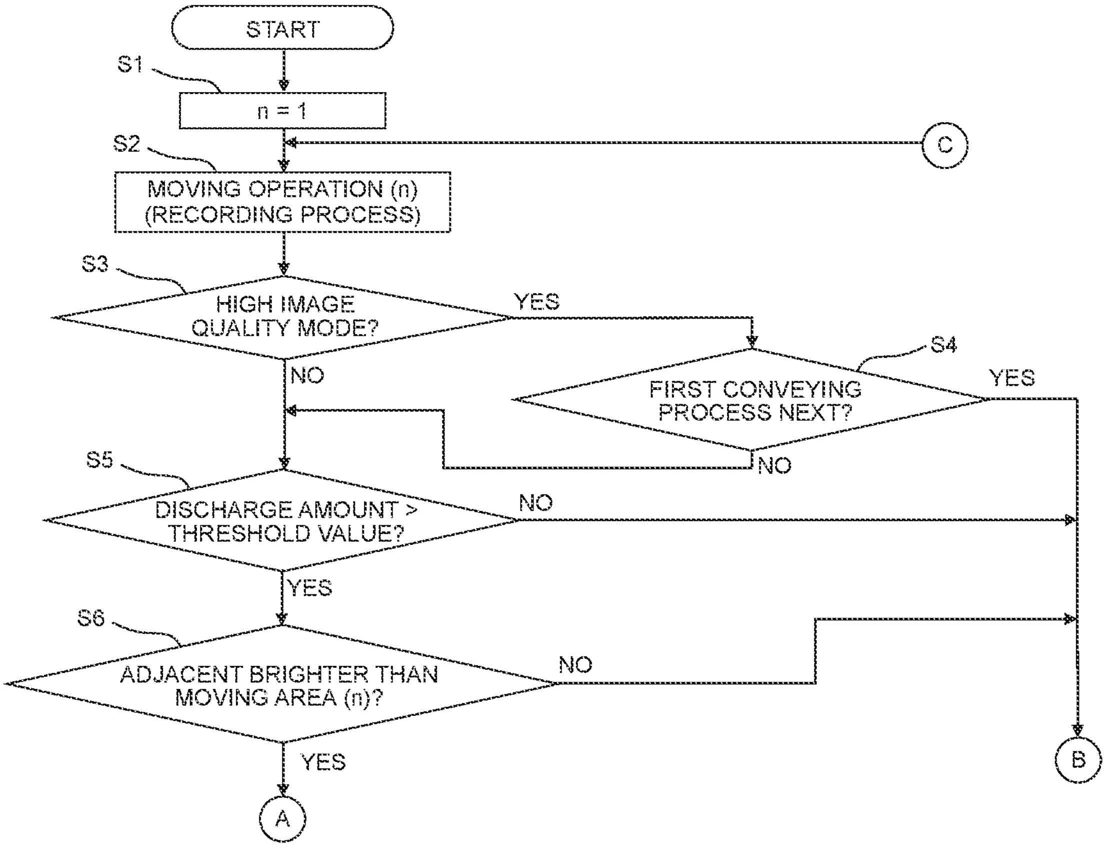
FIG. 5A and FIG. 5B depict a flow chart indicating a program executed by the CPU of the printer of FIG. 1.
Figure 5B:
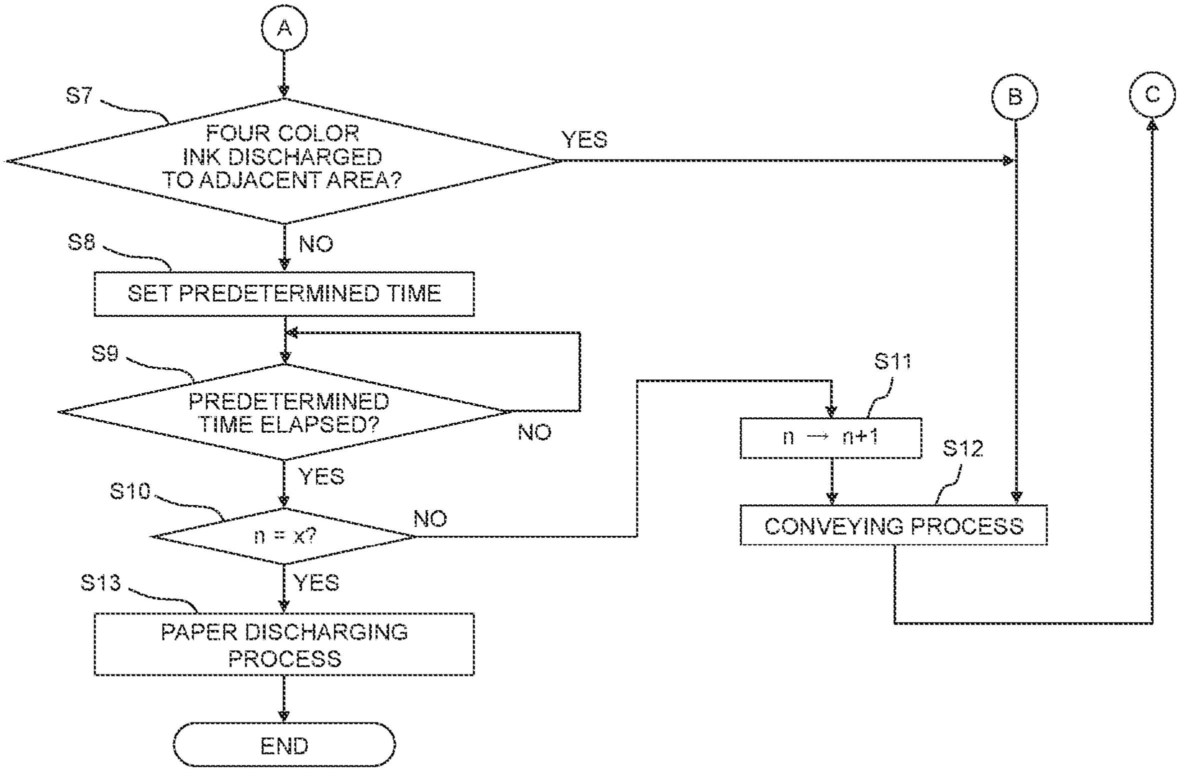

The CPU 91 first sets n=1 (step S1) as depicted in FIG. 5A.

After the step S1, the CPU 91 carries out the nth moving operation (n) (step S2). In the step S2, as described earlier on, the moving operation (the recording process) is carried out. That is, during the period of moving the carriage 20 and the head 10 in the main moving direction, the ink is discharged from the nozzles N onto the moving area R (n) of the paper P (see FIG. 6).

After the step S2, the CPU 91 determines whether or not the recording command requires an image quality mode to be a high image quality mode (step S3). The image quality mode includes an ordinary image quality mode and the high image quality mode.

The ordinary image quality mode applies a constant conveyance distance for the paper P in each conveying process, and the conveyance distance is almost the same as the length of the moving area R in the conveyance direction.

Figure 7:
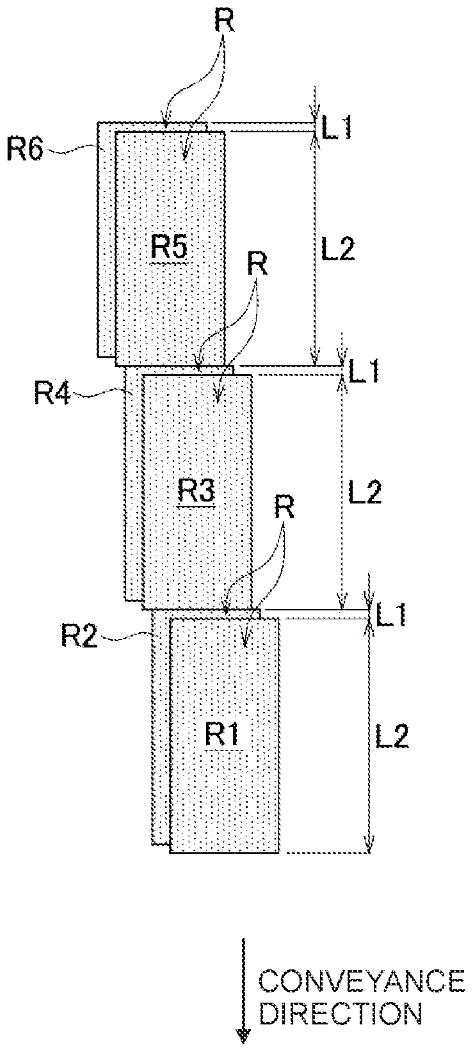
FIG. 7 depicts a schematic view depicting a situation where a first conveying process and a second conveying process are carried out repetitively.

The high image quality mode does not render a constant conveyance distance for the paper P in each conveying process. In the high image quality mode, as depicted in FIG. 7, alternately carries out a "first conveying process" to convey the paper P through a distance L1 in the conveyance direction, and a "second conveying process" to convey the paper P through a distance L2 in the conveyance direction. The distance L2 is longer than the distance L1, and almost the same as the length of the moving area R in the conveyance direction. The distance L1 and the distance L2 correspond to the "first distance" and the "second distance" of the present disclosure, respectively.

In the high image quality mode, the CPU 91 repeats the following routine. First, the CUP 91 carries out the moving operation (the first recording process) on the moving area R1 and then carries out the first conveying process. Then, the CPU 91 carries out the moving operation (the second recording process) on the moving area R2 after the first conveying process, and carrying out the second conveying process after the second recording process. In other words, after carrying out the second conveying process after the moving operation on the moving area R2, the CPU 91 further carries out the moving operation (the first recording process) on the moving area R3 and then carries out the first conveying process. After the first conveying process, the CPU 91 carries out the moving operation (the second recording process) on the moving area R4 and then carries out the second conveying process. After carrying out the second conveying process after the moving operation on the moving area R4, the CPU 91 further carries out the moving operation (the first recording process) on the moving area R5. Then, the CUP 91 carries out the first conveying process and, after the first conveying process, carries out the moving operation (the second recording process) on the moving area R6 and then carries out the second conveying process.

Note that in FIG. 7, in order for a ready understanding, there are depicted the moving areas R1 to R6 in a direction deviating from the direction orthogonal to the conveyance direction.

In one routine, the recording area (the moving area R) in the first recording process has a part overlapping in the conveyance direction with the recording area (the moving area R) in the second recording process. For example, the moving area R1 has an overlapping part with the moving area R2 in the conveyance direction, the moving area R3 has an overlapping part with the moving area R4 in the conveyance direction, and the moving area R5 has an overlapping part with the moving area R6 in the conveyance direction.

The recording area (the moving area R) in one routine of the first recording process does not overlap in the conveyance direction with the recording area (the moving area R) in the next routine of the first recording process. For example, the moving area R1 does not overlap with the moving area R3 in the conveyance direction, and the moving area R3 does not overlap with the moving area R5 in the conveyance direction.

If the high image quality mode is determined (step S3: Yes), then the CPU 91 determines whether or not the conveying process to be carried out after the moving operation (n) is the first conveying process (step S4).

If the high image quality mode is not determined (step S3: No) or if the high image quality mode is determined but the conveying process is not the first conveying process (but is the second conveying process) (step S4: No), then the CPU 91 determines whether or not the ink discharge amount from the nozzles N to the moving area R (n) exceeds a threshold value (step S5). Hereinbelow, the ink discharge amount to the moving area R (n) from the nozzles N will be referred to as the discharge amount to the moving area R (n). The step S5 corresponds to the "second determining process" of the present disclosure.

In the step S5, the CPU 91 first calculates the discharge amount to the moving area R (n) based on the image data included in the recording command and, further, reads out the threshold value stored in the ROM 92. Then, the CPU 91 determines whether or not the calculated discharge amount exceeds the threshold value read out from the ROM 92.

The threshold value differs according to the ink color. The components of the ink include a solvent, a color agent (pigment-based color agent, dye-based color agent or the like), resin, and other additives). The ink color depends on the color agent (pigment-based color agent, dye-based color agent or the like). The ink in the first embodiment is a pigment-based ink, and the content of pigment differs according to the color.

The brighter the ink, the less likely to be distinct on the paper P. In view of the fact that a brighter ink is less likely to be distinct on the paper P, a higher threshold value is set for a brighter ink in the first embodiment. For example, because the yellow ink is brighter than the black ink, the threshold value for the yellow ink is set higher than the threshold value for the black ink.

The ink with a lower content of pigment is less likely to attach to the rollers 51*a*, 52*a*, and 53*a* (see FIGS. 1 and 3). In the first embodiment, therefore, in view of this fact, a higher threshold value is set fir the ink with a lower content of pigment. For example, because the cyan ink has a lower content of pigment than the magenta ink, the threshold value for the cyan ink is set higher than the threshold value for the magenta ink. Because the magenta ink has a lower content of pigment than the black ink, the threshold value for the magenta ink is set higher than the threshold value for the black ink.

In the step S5, the CPU 91 calculates the discharge amount to the moving area R (n) according to each color. Further, the CPU 91 reads out the threshold value for each color stored in the ROM 92. Then, the CPU 91 determines whether or not the calculated discharge amount of each color exceeds the threshold value corresponding to that color read out from the ROM 92.

If the discharge amount is determined exceeding the threshold value with any one of the four colors (cyan, magenta, yellow and black); any two of the four colors; any three of the four colors; or all of the four colors (step S5: Yes), then the CPU 91 determines whether or not an adjacent area is brighter than the moving area R (n) based on the image data included in the recording command (step S6). The step S6 corresponds to the "third determining process" of the present disclosure. The adjacent area refers to the area adjacent to the moving area R (n) at the upstream of the moving area R (n) in the conveyance direction.

If n≠x (x: the last moving operation on the paper P), then the moving area R (n+1) corresponds to the adjacent area. The moving area R (n+1) is the area of the paper P where the ink is discharged in the (n+1)th moving operation (n+1), being adjacent to the moving area R (n) at the upstream of the moving area R (n) in the conveyance direction (see FIG. 6).

If n=x, then the margin area adjacent to the moving area R (n) at the upstream of the moving area R (n) in the conveyance direction corresponds to the adjacent area.

If n≠x, then the brightness of the adjacent area refers to the brightness after the relevant area undergoes the recording process. If n=x, then the brightness of the adjacent area refers to the brightness based on the color of the paper P.

If the adjacent area is determined brighter than the moving area R (n) (step S6: Yes), then the CPU 91 determines whether or not the ink of the four colors of cyan, magenta, yellow and black is discharged to the adjacent area, based on the image data included in the recording command (step S7). The step S7 corresponds to the "fourth determining process" of the present disclosure. For example, if an image including human characters is recorded in the adjacent area, then the ink of the four colors may be discharged.

If it is determined that the ink of the four colors is not discharged to the adjacent area (step S7: No), then the CPU 91 sets a predetermined time based on the discharge amount to the moving area R (n), and the conveyance time for the conveyer 50 to convey the paper P from the moving area R (n) to the rollers 51*a* (the rollers 51*a* being closest to the moving area R (n) in the conveyance direction among the rollers 51*a*, 52*a*, and 53*a*) (step S8). The step S8 corresponds to the "setting process" of the present disclosure. For example, the CPU 91 sets a longer predetermined time for a larger discharge amount to the moving area R (n) or sets a longer predetermined time for a shorter conveyance time for the distance from the moving area R (n) to the rollers 51*a*.

The conveyance time for the distance from the moving area R (n) to the rollers 51*a* is calculated based on the distance D from the moving area R (n) to the rollers 51*a* in the conveyance direction (see FIG. 6) and the conveying speed for the conveyer 50 to convey the paper P.

The discharge amount to the moving area R (n) is, in the same manner as in the step S5, calculated for each color based on the image data included in the recording command. In the step S8, the CPU 91 sets the predetermined time based on the conveyance time and the discharge amount of each color to the moving area R (n). For example, the CPU 91 lets the longest temporally set time be the predetermined time among the temporally set times set based on the discharge amount of each color to the moving area R (n) and the above conveyance time.

That is, in the step S8, the CPU 91 sets the predetermined time based on the ink color (the color agent being one of the components). In particular, in view of the fact that a brighter ink is less likely to be distinct on the paper P, a shorter temporarily set time is provided for a brighter ink. For example, because the yellow ink is brighter than the black ink, the temporarily set time for the yellow ink is shorter than the temporarily set time for the black ink. Further, the ink with a lower content of pigment is less likely to attach to the rollers 51*a*, 52*a*, and 53*a* (see FIGS. 1 and 3). In view of this, a shorter temporarily set time is provided for the ink with a lower content of pigment. For example, because the cyan ink has a lower content of pigment than the magenta ink, the temporarily set time for the cyan ink is shorter than the temporarily se time for the magenta ink. Because the magenta ink has a lower content of pigment than the black ink, the temporarily set time for the magenta ink is shorter than the temporarily set time for the black ink.

After the step S8, the CPU 91 determines whether or not the predetermined time has elapsed since the end time of the moving operation (n) (step S9). If the predetermined time has not yet elapsed (step S9: No), then the CPU 91 repeats the step S9.

Note that in the period from the end point of the moving area R (n) to the point when the predetermined time has elapsed, the CPU 91 causes the driver IC 14 to drive to vibrate the meniscus formed in the nozzles N without discharging the ink from the nozzles N. That is, the CPU 91 carries out a non-discharge flushing by causing the driver IC 14 to drive. By virtue of this, in the period from the end point of the moving area R (n) to the point when the predetermined time has elapsed, it is possible to suppress the problem of thickening the ink in the nozzles N.

If it is determined that the predetermined time has elapsed (step S9: Yes), then the CPU 91 determines whether or not n=x (step S10).

If n is not equal to x (step S10: No), then the CPU 91 sets n=n+1 (step S11), carries out the conveying process (for the conveyer 50 to convey the paper P through a predetermined distance in the conveyance direction) (step S12), and returns the process to the step S2.

If n=x (step S10: Yes), then the CPU 91 carries out a paper discharging process (step S13), and ends the program. In the step S13, the CPU 91 carries out a process of driving the conveyer 50 to convey the paper P in the conveyance direction up to a paper discharging unit (not depicted) at the downstream of the third roller set 53 in the conveyance direction.

As described above, according to the first embodiment, the CPU 91 sets the predetermined time based on the discharge amount to the moving area R (n), and the conveyance time for the conveyer 50 to convey the paper P from the moving area R (n) to the rollers 51*a* (step S8), and carries out the conveying process (step S12) after the predetermined time has elapsed since the moving operation (n) (step S9: Yes). By virtue of this, until the rollers 51*a*, 52*a*, and 53*a* fall into the moving area R (n), it is possible to dry the ink landed in the moving area R (n). By virtue of this, it is possible to suppress the problem that the ink landed on the moving area R (n) of the paper P gets attached to the rollers 51*a*, 52*a*, and 53*a*.

The CPU 91 carries out the setting process (step S8) and the first determining process (step S9) after determining that the discharge amount to the moving area R (n) exceeds the threshold value (step S5: Yes). If the discharge amount to the moving area R (n) exceeds the threshold value, then it takes some time to dry the ink landed in the moving area R (n). Therefore, on this occasion, by setting the predetermined time, it is possible to suppress the problem that the ink landed in the moving area R (n) gets attached to the rollers 51*a*, 52*a*, and 53*a*. On the other hand, if the discharge amount to the moving area R (n) does not exceed the threshold value, then it does not take much time to dry the ink landed in the moving area R (n). Therefore, on this occasion, the predetermined time is not provided such that it is possible to suppress decrease of the recording speed.

The ink is composed of solvent, color agent, resin, additive, and the like and, according to the type and ratio of each component, there is a difference in how likely the ink is to be distinct on the paper P and how likely the ink is to attach to the roller 51*a*, 52*a*, and 53*a*. In view of this, the threshold value differs according to the ink component (the color agent as the cause of the ink color in the first embodiment). According to the first embodiment, the threshold value differs according to the ink component. By virtue of this, it is possible to determine accurately whether or not to set the predetermined time. Further, any needless predetermined time is not provided such that it is possible to suppress decrease in the recording speed.

As described above, this is due to considering that the ink is composed of solvent, color agent, resin, additive, and the like and, according to the type and ratio of each component, there is a difference in how likely the ink is to be distinct on the paper P and how likely the ink is to attach to the roller 51*a*, 52*a*, and 53*a*. In view of this, the CPU 91 sets the predetermined time (step S8) based on the ink component (the color agent as the cause of the ink color in the first embodiment). According to the first embodiment, in the step S8, not only the conveyance time is set for the conveyer 50 to convey the paper P from the moving area R (n) to the rollers 51*a* and the discharge amount to the moving area R (n), but also the predetermined time is set based on the ink component. By virtue of this, it is possible to accurately set the predetermined time. Further, the predetermined time is not set needlessly long such that it is possible to suppress decrease in the recording speed.

The CPU 91 carries out the steps S5 to S9 with the moving area R (n) as the recording area extending in the main moving direction. In this manner, each of the steps S5 to S9 is controlled more easily.

The CPU 91 carries out the setting process (step S8) and the first determining process (step S9) after determining that the adjacent area is brighter than the moving area R (n) (step S6: Yes). When the adjacent area is brighter than the moving area R (n), if the ink attached to the rollers 51*a*, 52*a*, and 53*a* transfers to the adjacent area, then the transferred ink is more likely to be distinct. Therefore, in such a case, by setting the predetermined time, it is possible to suppress the problem of the distinct transferred ink. On the other hand, if the adjacent area is not brighter than the moving area R (n), then even if the ink attached to the rollers 51*a*, 52*a*, and 53*a* transfers to the adjacent area the transferred ink is still less likely to be distinct. Therefore, without providing the predetermined time on this occasion, it is possible to suppress decrease in the recording speed.

If the CPU 91 determines that the ink of the four colors of cyan, magenta, yellow and black is not discharged to the adjacent area (step S7: No), then it carries out the setting process (step S8) and the first predetermining process (step S9). When the four color ink is not discharged to the adjacent area, if the ink attached to the rollers 51*a*, 52*a*, and 53*a* transfers to the adjacent area, then the transferred ink is more likely to be distinct. Therefore, in such a case, by setting the predetermined time, it is possible to suppress the problem of the distinct transferred ink. On the other hand, if the four color ink is discharged to the adjacent area, then even if the ink attached to the rollers 51*a*, 52*a*, and 53*a* transfers to the adjacent area, the transferred ink is still less likely to be distinct. Therefore, without providing the predetermined time on this occasion, it is possible to suppress decrease in the recording speed.

If the CPU 91 determines that in the high image quality mode (step S3: Yes), the next process is not the first conveying process (but the second conveying process) (step S4: No), then it carries out the setting process (step S8) and the first predetermining process (step S9). That is, in this case, the moving operation (n) carried out in the step S2 corresponds to the second recording process through one routine of the high image quality mode, and the conveying process carried out in the step S12 corresponds to the second conveying process through that one routine of the high image quality mode. The CPU 91 carries out the setting process (step S8) and the first predetermining process (step S9) after the second recording process (step S2) but before the second conveying process (step S12), in that one routine. If the predetermined time is set before the first conveying process, then the ink discharged in the first recording process will be dried such that the color tone will change between the recorded images being superimposed by the first recording process and the second recording process (see the moving area R1 and the moving area R2 of FIG. 7, etc.). In this regard, in the first embodiment, the first determining process is carried out before the second conveying process, so that even if the predetermined time is set, it is still possible to suppress the abovementioned problem of the change in color tone.

Second Embodiment

Next, referring to FIG. 8, a second embodiment of the present disclosure will be explained.

In the first embodiment (FIG. 6), the moving area R (n) is taken as the recording area for carrying out the steps S5 to S9. However, in the second embodiment (FIG. 8), parts P1, P2 and P3 of the moving area R (n) are taken as the recording areas for carrying out the steps S5 to S9 (the parts P1, P2, and P3 are those facing the rollers 51*a*, 52*a*, and 53*a* respectively in the orthogonal direction when the paper P is conveyed in the conveyance direction).

Each part P1 of the moving area R (n) faces a roller 51*a* in the orthogonal direction when the paper P is conveyed in the conveyance direction. Each part P2 of the moving area R (n) faces a roller 52*a* in the orthogonal direction when the paper P is conveyed in the conveyance direction. Each part P3 of the moving area R (n) faces a roller 53*a* in the orthogonal direction when the paper P is conveyed in the conveyance direction.

Figure 8:
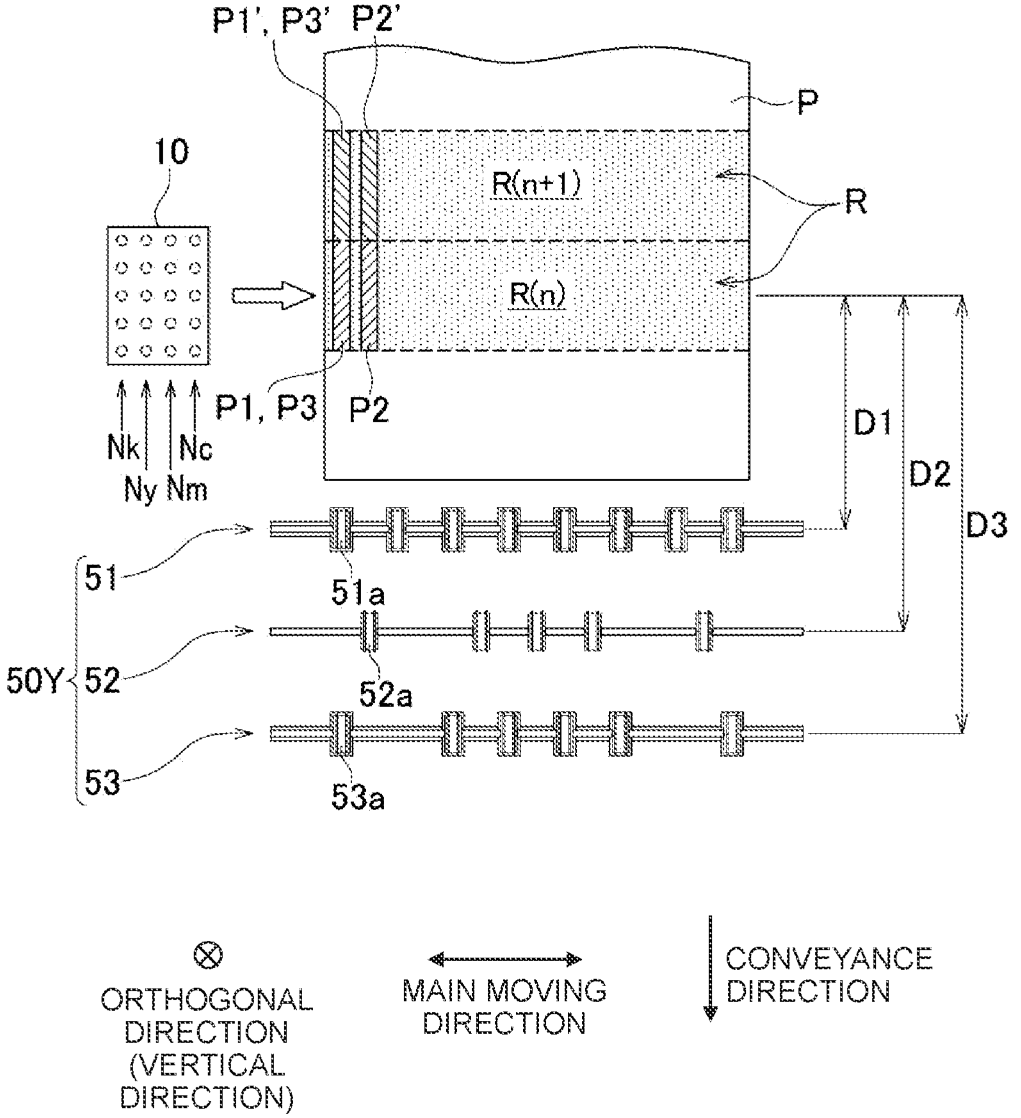
FIG. 8 depicts a schematic view for explaining a setting method for a predetermined time.

FIG. 8 only shows the part P1 corresponding to the leftmost one of the plurality of rollers 51*a*, the part P2 corresponding to the leftmost one of the plurality of rollers 52*a*, and the part P3 corresponding to the leftmost one of the plurality of rollers 53*a*. In the example of FIG. 8, because the leftmost one of the plurality of rollers 51*a* is in the same position as the leftmost one of the plurality of rollers 53*a* according to the main moving direction, the parts P1 and P3 are depicted with the same drawing.

In the step S5, the CPU 91 determines whether or not the discharge amount to each of the parts P1 to P3 exceeds the threshold value.

If the discharge amount is determined exceeding the threshold value for any one of the parts P1 to P3; any two of the parts P1 to P3; or all of the parts P1 to P3 (step S5: Yes), then the CPU 91 determines whether or not the adjacent area is brighter than each of the parts P1 to P3 (step S6).

In the second embodiment, the adjacent area refers to the area adjacent to each of the parts P1 to P3 at the upstream of each of the parts P1 to P3 in the conveyance direction.

If n≠x (x: the last moving operation on the paper P), then in the moving area R (n+1), the parts P1', P2', and P3' facing the rollers 51*a*, 52*a*, and 53*a*, when the paper P is conveyed in the conveyance direction, correspond to the adjacent areas.

If n=x, the margin areas adjacent to the parts P1 to P3 at the upstream of the parts P1 to P3 in the conveyance direction correspond to the adjacent areas.

If any one of the adjacent areas to the parts P1 to P3; any two of the adjacent areas to the parts P1 to P3; or all of the adjacent areas to the parts P1 to P3 is/are determined brighter than the corresponding parts P1 to P3 (step S6: Yes), then the CPU 91 determines whether or not the ink of the four colors of cyan, magenta, yellow and black is discharged to the adjacent area, based on the image data included in the recording command (step S7). The adjacent area defined in the step S7 is the same as that defined in the step S6.

If it is determined that the ink of the four colors is not discharged to at least the adjacent areas to the parts P1 to P3 (step S7: No), then the CPU 91 sets the predetermined time based on the discharge amount to each of the parts P1 to P3, and the conveyance time for the conveyer 50 to convey the paper P from each of the parts P1 to P3 to the rollers 51*a*, 52*a*, and 53*a* corresponding to the respective parts P1 to P3 (step S8).

That is, in the second embodiment, the predetermined time is set for each of the parts P1 to P3. For the part P1, the predetermined time is set based on the discharge amount to the part P1, and the conveyance time for the conveyer 50 to convey the paper P from the part P1 to the rollers 51*a*. For the part P2, the predetermined time is set based on the discharge amount to the part P2, and the conveyance time for the conveyer 50 to convey the paper P from the part P2 to the rollers 52*a*. For the part P3, the predetermined time is set based on the discharge amount to the part P3, and the conveyance time for the conveyer 50 to convey the paper P from the part P3 to the rollers 53*a*.

The conveyance time for the conveyer 50 to convey the paper P from the part P1 to the rollers 51*a* is calculated based on the distance D1 from the part P1 to the rollers 51*a* in the conveyance direction and the conveying speed for the conveyer 50 to convey the paper P. The conveyance time for the conveyer 50 to convey the paper P from the part P2 to the rollers 52*a* is calculated based on the distance D2 from the part P2 to the rollers 52*a* in the conveyance direction and the conveying speed for the conveyer 50 to convey the paper P. The conveyance time for the conveyer 50 to convey the paper P from the part P3 to the rollers 53*a* is calculated based on the distance D3 from the part P3 to the rollers 53*a* in the conveyance direction and the conveying speed for the conveyer 50 to convey the paper P.

After the step S8, the CPU 91 determines whether or not the predetermined time set for each of the parts P1 to P3 has elapsed since the end time of the recording process on the corresponding one of the parts P1 to P3 (step S9). If the predetermined time has elapsed for all parts P1 to P3 (step S9: Yes), then the process proceeds to the step S10.

As described above, according to the second embodiment, by carrying out the steps S5 to S9 with the parts P1 to P3 of the moving area R (n) as the recording areas corresponding to the rollers 51*a*, 52*a*, and 53*a*, it is possible to carry out each process more accurately. For example, whether or not the discharge amount to each of the parts P1 to P3 exceeds the threshold value is determined in the step S5. By virtue of this, it is possible to accurately determine whether or not setting the predetermined time is needed. Then, any needless predetermined time is not provided such that it is possible to suppress decrease in the recording speed. Further, because the predetermined time can be set more accurately in the step S8, the predetermined time is not set needlessly long such that it is possible to suppress decrease in the recording speed.

Third Embodiment

Figure 9:
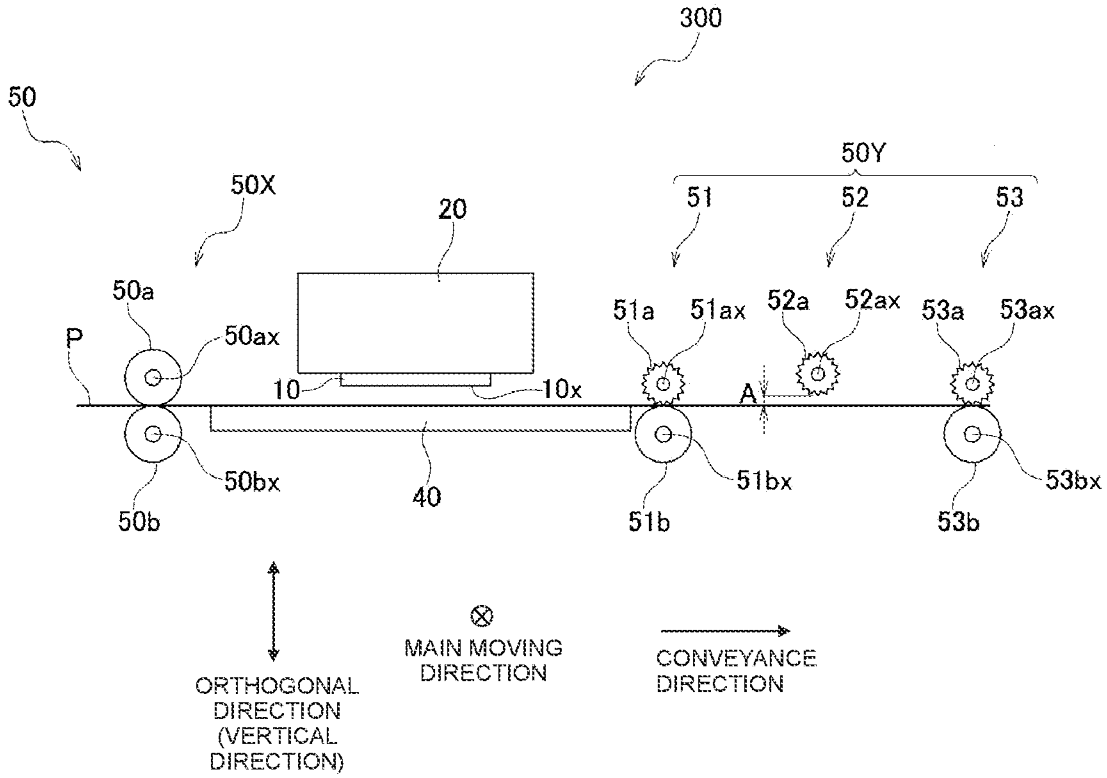
FIG. 9 depicts a side view corresponding to FIG. 3.

Next, referring to FIG. 9, a third embodiment of the present disclosure will be explained.

In the printer 100 according to the first embodiment (see FIG. 3), the rollers 51*a*, 52*a*, and 53*a* of the downstream roller unit 50Y are at the same positional level in the orthogonal direction. However, in a printer 300 of the third embodiment, among the rollers 51*a*, 52*a*, and 53*a* of the downstream roller unit 50Y (see FIG. 9), the roller 52*a* is positioned above the other rollers 51*a* and 53*a* by a distance A.

That is, in the third embodiment, the contact points between the rollers 51*a* and 53*a* and the paper P are different in positional level in the orthogonal direction from the contact points between the rollers 52*a* and the paper P. The contact points between the rollers 52*a* and the paper P are positioned above the contact points between the rollers 51*a* and 53*a* and the paper P by the distance A. The rollers 51*a* and 53*a* correspond to the "first roller" of the present disclosure, whereas the rollers 52*a* correspond to the "second roller" of the present disclosure.

In the third embodiment, in the same manner as in the second embodiment (see FIG. 8), in the step S5, the CPU 91 determines whether or not the discharge amount to each of the parts P1 to P3 exceeds the threshold value. The parts P1 and P3 correspond to the "first part" of the present disclosure, whereas the part P2 corresponds to the "second part" of the present disclosure.

Further, in the third embodiment, the threshold value used in the step S5 is configured to be different between the parts P1 to P3 corresponding to the rollers 51*a* and 53*a* and the part P2 corresponding to the roller 52*a*. That is, the threshold value used in the step S5 differs according to the position of the contact points in the orthogonal direction between the rollers 51*a*, 52*a*, and 53*a* and the paper P. In particular, the lower the position of the contact in the orthogonal direction, the more likely the ink is to attach to the rollers 51*a*, 52*a*, and 53*a*. In view of this, according to the third embodiment, the lower the position of the contact in the orthogonal direction, the lower the threshold value is set. Therefore, the threshold value (a first threshold value) for the parts P1 to P3 corresponding to the rollers 51*a* and 53*a* is lower than the threshold value (a second threshold value) for the part P2 corresponding to the roller 52*a*. The threshold value includes the first threshold value and the second threshold value.

Then, in the same manner as in the second embodiment (see FIG. 8), if the CPU 91 determines that in any one of the parts P1 to P3; any two of the parts P1 to P3; or all of the parts P1 to P3, the discharge amount exceeds the threshold value (step S5: Yes), then the process proceeds to the step S6. That is, the CPU 91 determines in the step S5 whether or not one of the following three conditions is satisfied: 1) the discharge amount to the parts P1 and P3 (the first part) exceeds the first threshold value; or 2) the discharge amount to the part P2 (the second part) exceeds the second threshold value; or 3) the discharge amount to the parts P1 and P3 (the first part) exceeds the first threshold value and the discharge amount to the part P2 (the second part) exceeds the second threshold value.

In the same manner as in the second embodiment (see FIG. 8), the CPU 91 sets the predetermined time for each of the parts P1 to P3 based on the discharge amount to the parts P1 to P3, and the conveyance time for the conveyer 50 to convey the paper P from each of the parts P1 to P3 to the corresponding one of the rollers 51*a*, 52*a*, and 53*a*.

Further, in the third embodiment, in the step S8 the CPU 91 sets the predetermined time for each of the parts P1 to P3 based on the contact position between the paper P and the corresponding one of the rollers 51*a*, 52*a*, and 53*a* in the orthogonal direction. In particular, the lower the position of the contact in the orthogonal direction, the more likely the ink is to attach to the rollers 51*a*, 52*a*, and 53*a*. In view of this, the lower the position of the contact in the orthogonal direction, the longer the predetermined time is set by the CPU 91. Therefore, the predetermined time for the parts P1 and P3 corresponding to the rollers 51*a* and 53*a* is longer than the predetermined time for the part P2 corresponding to the roller 52*a*.

After the step S8, the CPU 91 determines whether or not the predetermined time set for each of the parts P1 to P3 has elapsed since the end time of the recording process on the corresponding one of the parts P1 to P3 (step S9). If the predetermined time has elapsed for all parts P1 to P3 (step S9: Yes), then the process proceeds to the step S10.

As described above, according to the third embodiment, the CPU 91 sets the predetermined time corresponding to each of the rollers 51*a*, 52*a*, and 53*a* based on the contact point between the paper P and the corresponding one of the rollers 51*a*, 52*a*, and 53*a* in the orthogonal direction (step S8). This is because of, as described earlier on, considering that according to the position of the contact in the orthogonal direction, there is a difference in how likely the ink is to attach to the rollers 51*a*, 52*a*, and 53*a*. According to the third embodiment, the CPU 91 sets not only the predetermined time in the step S8, based on the positions of the contact points of the rollers 51*a*, 52*a*, and 53*a* in the orthogonal direction, but also the conveyance time for the conveyer 50 to convey the paper P from the moving area R (n) to the rollers 51*a*, 52*a*, and 53*a* and the discharge amount to the moving area R (n). By virtue of this, it is possible to accurately set the predetermined time. Further, the predetermined time is not set needlessly long such that it is possible to suppress decrease in the recording speed.

Further, according to the third embodiment, the threshold value differs according to the position of the contact points in the orthogonal direction between the rollers 51*a*, 52*a*, and 53*a* and the paper P. This is because of, as described earlier on, considering that according to the position of the contact in the orthogonal direction, there is a difference in how likely the ink is to attach to the rollers 51*a*, 52*a*, and 53*a*. According to the third embodiment, the threshold value differs according to the position of the contact points in the orthogonal direction between the rollers 51*a*, 52*a*, and 53*a* and the paper P. By virtue of this, the CPU 91 can accurately determine whether or not setting the predetermined time is needed. Further, any needless predetermined time is not provided such that it is possible to suppress decrease in the recording speed.

Fourth Embodiment

Next, a fourth embodiment of the present disclosure will be explained.

In the first embodiment, the processes are carried out without considering the material of the rollers 51*a*, 52*a*, and 53*a* of the downstream roller unit 50Y. In the fourth embodiment, however, the process will be carried out with a consideration of the material of the rollers 51*a*, 52*a*, and 53*a* of the downstream roller unit 50Y.

In the fourth embodiment, the rollers 51*a* and 53*a* are resinic while the roller 52*a* is metallic. That is, the rollers 51*a* and 53*a* are different in material from the roller 52*a*. The rollers 51*a* and 53*a* correspond to the "first roller" of the present disclosure whereas the roller 52*a* corresponds to the "second roller" of the present disclosure.

In the fourth embodiment, in the same manner as in the second embodiment (see FIG. 8), in the step S5, the CPU 91 determines whether or not the discharge amount to each of the parts P1 to P3 exceeds the threshold value. The parts P1 and P3 correspond to the "first part" of the present disclosure, whereas the part P2 corresponds to the "second part" of the present disclosure.

Further, in the fourth embodiment, the threshold value used in the step S5 is configured to be different between the parts P1 to P3 corresponding to the rollers 51*a* and 53*a* and the part P2 corresponding to the roller 52*a*. That is, the threshold value used in the step S5 differs according to the material of the rollers 51*a*, 52*a*, and 53*a*. In particular, in considering that the ink is more likely to attach to a resinic roller than a metallic roller, thus the threshold value (the first threshold value) for the parts P1 to P3 corresponding to the resinic rollers 51*a* and 53*a* is set lower than the threshold value (the second threshold value) for the part P2 corresponding to the metallic roller 52*a*. Therefore, the threshold value (the first threshold value) for the parts P1 to P3 corresponding to the resinic rollers 51*a* and 53*a* is lower than the threshold value (the second threshold value) for the part P2 corresponding to the metallic roller 52*a*. The threshold value includes the first threshold value and the second threshold value.

Then, in the same manner as in the second embodiment (see FIG. 8), if the CPU 91 determines that in any one of the parts P1 to P3, any two of the parts P1 to P3; or all of the parts P1 to P3, the discharge amount exceeds the threshold value (step S5: Yes), then the process proceeds to the step S6. That is, the CPU 91 determines in the step S5 whether or not one of the following three conditions is satisfied: 1) the discharge amount to the parts P1 and P3 (the first part) exceeds the first threshold value; or 2) the discharge amount to the part P2 (the second part) exceeds the second threshold value; or 3) the discharge amount to the parts P1 and P3 (the first part) exceeds the first threshold value and 2) the discharge amount to the part P2 (the second part) exceeds the second threshold value.

In the step S8, in the same manner as in the second embodiment (see FIG. 8), the CPU 91 sets the predetermined time for each of the parts P1 to P3 based on the discharge amount to the parts P1 to P3, and the conveyance time for the conveyer 50 to convey the paper P from each of the parts P1 to P3 to the corresponding one of the rollers 51*a*, 52*a*, and 53*a*.

Further, in the fourth embodiment, the predetermined time for each of the parts P1 to P3 is set in the step S8 based on the material of corresponding one of the rollers 51*a*, 52*a*, and 53*a*. In particular, in considering that the ink is more likely to attach to a resinic roller than a metallic roller, thus the predetermined time for the parts P1 and P3 corresponding to the rollers 51*a* and 53*a* is set longer than the predetermined time for the part P2 corresponding to the metallic roller 52*a*.

After the step S8, the CPU 91 determines whether or not the predetermined time set for each of the parts P1 to P3 has elapsed since the end time of the recording process on the corresponding one of the parts P1 to P3 (step S9). If the CPU 91 determines that the predetermined time has elapsed for all parts P1 to P3 (step S9: Yes), then the process proceeds to the step S10.

As described above, according to the fourth embodiment, the CPU 91 sets the predetermined time corresponding to each of the rollers 51*a*, 52*a* and 53*a* based on the material of each of the rollers 51*a*, 52*a*, and 53*a* (step S8). This is because of, as described earlier on, considering that according to the roller material, there is a difference in how likely the ink is to attach to the rollers 51*a*, 52*a*, and 53*a*, According to the fourth embodiment, by setting the predetermined time in the step S8, based on not only the materials of the rollers 51*a*, 52*a*, and 53*a*, but also the conveyance time for the conveyer 50 to convey the paper P from the moving area R (n) to the rollers 51*a*, 52*a*, and 53*a* and the discharge amount to the moving area R (n), it is possible to accurately set the predetermined time. Furthermore, the predetermined time is not set needlessly long such that it is possible to suppress decrease in the recording speed.

Further, according to the fourth embodiment, the threshold value differs according to the material of each of the rollers 51*a*, 52*a*, and 53*a*. This is because of, as described earlier on, considering that according to the materials of the rollers 51*a*, 52*a* and 53*a*, there is a difference in how likely the ink is to attach to the rollers 51*a*, 52*a*, and 53*a*. According to the fourth embodiment, with the threshold value differing according to the materials of the rollers 51*a*, 52*a*, and 53*a*, the CPU 91 can accurately determine whether or not setting the predetermined time is needed. Further, any needless predetermined time is not provided such that the CPU 91 can suppress decrease in the recording speed.

Fifth Embodiment

Figure 10:
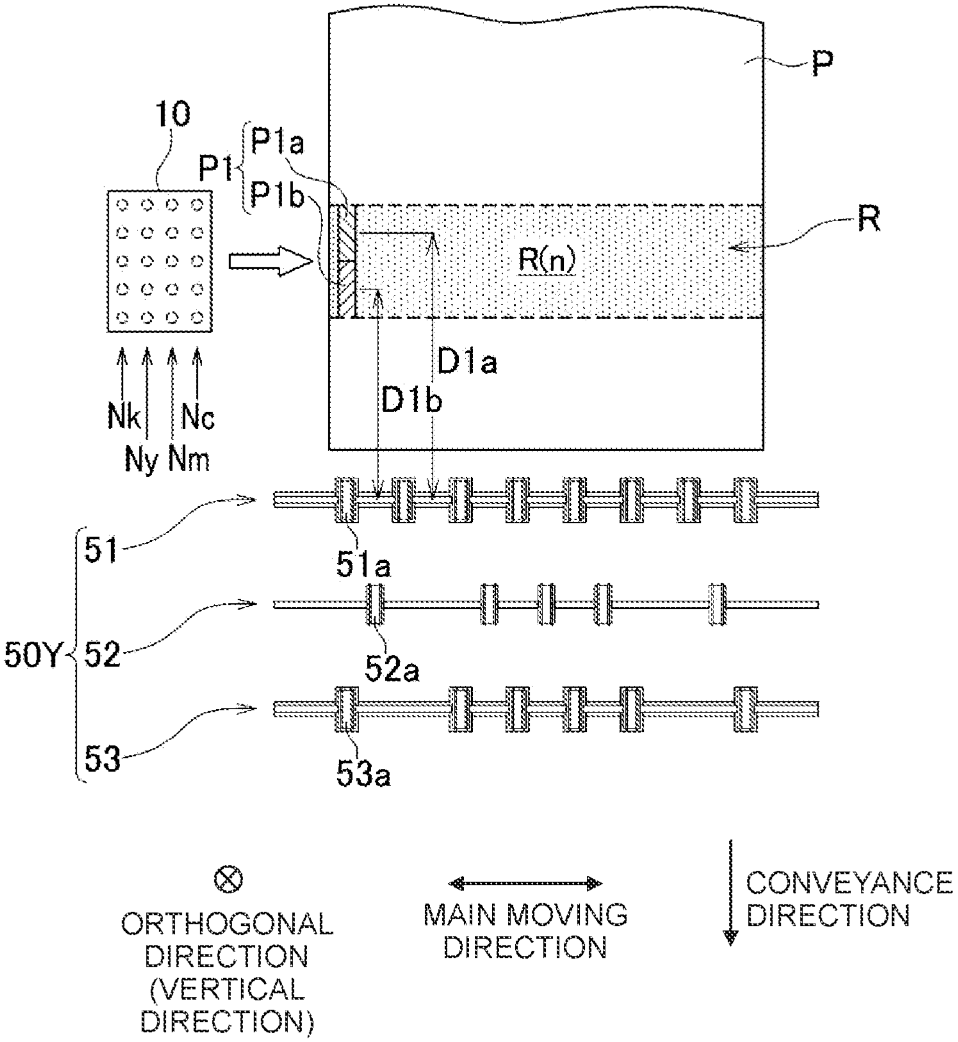
FIG. 10 depicts a schematic view for explaining a setting method for a predetermined time.

Next, referring to FIG. 10, a fifth embodiment of the present disclosure will be explained.

In the first embodiment (FIG. 6), the steps S5 to S9 are carried out with the moving area R (n) as the recording area. In the fifth embodiment (FIG. 10), however, the steps S5 to S9 are carried out with parts of the moving area R (n) (an upstream part P1*a* and a downstream part P1*b* which have further divided each of the parts facing the rollers 51*a*, 52*a*, and 53*a* in the orthogonal direction when the paper P is conveyed in the conveyance direction) as the recording areas. Note that FIG. 10 shows the part P1 corresponding to the leftmost roller 51*a*, and the upstream part P1*a* and the downstream part P1*b* dividing the former. The downstream part P1*b* is positioned at the downstream of the upstream part P1*a* in the conveyance direction.

In the step S5, the CPU 91 determines whether or not any one of the discharge amounts to the pans P1*a* and P1*b* or both of the discharge amounts to the pans P1*a* and P1*b* exceeds the threshold value. If the discharge amount to one of the upstream part P1*a* and the downstream part P1*b* exceeds the threshold value (step S5: Yes), then the CPU 91 causes the process to proceed to the step S6.

In the step S8, the CPU 91 sets the predetermined time based on the discharge amount to each of the parts P1*a* and P1*b*, and the conveyance time for the conveyer 50 to convey the paper P from each of the parts P1*a* and P1*b* to the corresponding one of the rollers 51*a*, 52*a*, and 53*a*.

That is, in the fifth embodiment, the predetermined time is set for each of the parts P1*a* and P1*b*. For example, the predetermined time for the upstream part P1*a* is set based on the discharge amount to the upstream part P1*a*, and the conveyance time for the conveyer 50 to convey the paper P from the upstream part P1*a* to the roller 51*a*. The predetermined time for the downstream part P1*b* is set based on the discharge amount to the downstream part P1*b*, and the conveyance time for the conveyer 50 to convey the paper P from the downstream part P1*b* to the roller 51*a*. The predetermined time set for the upstream part P1*a* is referred to as the "first predetermined time" whereas the predetermined time set for the downstream part P1*b* is referred to as the "second predetermined time".

The conveyance time for the conveyer 50 to convey the paper P from the upstream part P1*a* to the rollers 51*a* is calculated based on the distance D1*a* from the upstream part P1*a* to the rollers 51*a* in the conveyance direction and the conveying speed for the conveyer 50 to convey the paper P. The conveyance time for the conveyer 50 to convey the paper P from the downstream part P1*b* to the rollers 51*a* is calculated based on the distance D1*b* from the downstream part P1*b* to the rollers 51*a* in the conveyance direction and the conveying speed for the conveyer 50 to convey the paper P.

Much the same is true on the upstream parts and the downstream parts corresponding respectively to the rollers 52*a* and 53*a*.

After the step S8, the CPU 91 determines whether or not the predetermined time set for each of the parts P1*a* and P1*b* has elapsed since the end time of the recording process on the corresponding one of the parts P1*a* and P1*b* (step S9). If the CPU 91 determines that the predetermined time has elapsed for both parts P1*a* and P1*b* (step S9: Yes), then the process proceeds to the step S10.

As described above, according to the fifth embodiment, the steps S5 to S9 are carried out with the upstream parts P1*a* and the downstream parts P1*b* divided in the conveyance direction as the recording areas. By virtue of this, it is possible to carry out each process more accurately. For example, the CPU 91 determines whether or not the discharge amount to each of the parts P1*a* and P1*b* exceeds the threshold value in the step S5. By virtue of this, the CPU 91 can accurately determine whether or not setting the predetermined time is needed. Further, any needless predetermined time is not provided such that it is possible to suppress decrease in the recording speed. Further, the CPU 91 can set the predetermined time more accurately in the step S8. Further, the predetermined time is not set needlessly long such that it is possible to suppress decrease in the recording speed.

Sixth Embodiment

Next, referring to FIGS. 11 and 12, a sixth embodiment of the present disclosure will be explained.

In the first embodiment (FIG. 6), the steps S5 to S9 are carried out with the moving area R (n) as the recording area. In the sixth embodiment (FIG. 12), however, the steps S5 to S9 are carried out with part of the moving area R (n) (a part facing each roller 51*a* in the orthogonal direction when the paper P is conveyed in the conveyance direction) as the recording area.

Further, in the sixth embodiment, if the paper P has a larger length in the main moving direction than a predetermined length, then the CPU 91 organizes the four rollers 51*a* positioned in the center of the main moving direction into two roller groups G1 and G2, and organizes the four parts P1 corresponding to the four rollers 51*a* into two groups X1 and X2. Then, the CPU 91 carries out the steps S5 to S9 for each of the groups X1 and X2. The first roller set 51 constituting the conveyer includes the two roller groups G1 and G2 including respectively the two rollers 51*a* aligning in the main moving direction.

Figure 11:
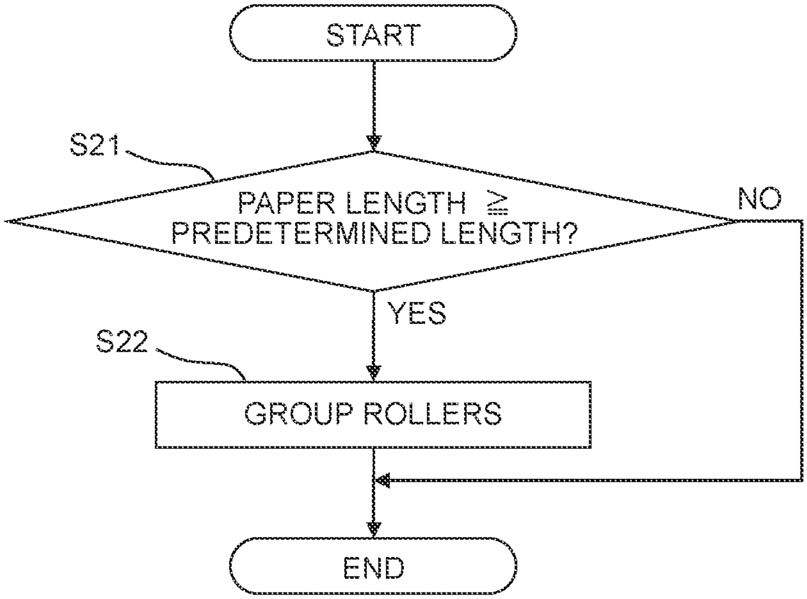
FIG. 11 depicts a flow chart indicating a program executed by the CPU of the printer of the present disclosure.

The CPU 91 executes the program of FIG. 11 before carrying out the program of FIG. 5.

According to the program of FIG. 11, based on the recording command, the CPU 91 determines whether or not the length of the paper P in the main moving direction is equal to or larger than the predetermined length (for example, the length of a letter size, A4 size, or the like) (step S21). If the length of the paper P in the main moving direction is determined as equal to or larger than the predetermined length (step S21: Yes), then as depicted in FIG. 12, the CPU 91 organizes the four rollers 51*a* positioned in the center of the main moving direction into the two roller groups G1 and G2, and organizes the four parts P1 corresponding to the four rollers 51*a* into the two groups X1 and X2 (step S22). After the step S22 or if the length of the paper P is determined as smaller than the predetermined length (step S21: No), the CPU 91 ends the execution of the program.

If the rollers 51*a* (the parts P1) are not grouped according to the program of FIG. 11 (in the step S22), then in the steps S5 to S9 of FIG. 5, the CPU 91 carries out the process for each part P1.

In particular, in the step S5, the CPU 91 determines whether or not the discharge amount to each of the parts P1 exceeds the threshold value. If the discharge amount to one or more of the parts P1 exceeds the threshold value (step S5: Yes), then the CPU 91 determines whether or not an adjacent area is brighter than each part P1 (step S6). The adjacent area refers to the area adjacent to each part P1 at the upstream of each part P1 in the conveyance direction. If n≠x (x: the last moving operation on the paper P), then the part P1' as in the second embodiment (FIG. 8) corresponds to the adjacent area. If n=x, then the margin area adjacent to the part P1 at the upstream of the part P1 in the conveyance direction corresponds to the adjacent area. If at least one adjacent area to a part P1 is determined brighter than the corresponding part P1 (step S6: Yes), then the CPU 91 determines whether or not the ink of the four colors of cyan, magenta, yellow and black is discharged to the adjacent area, based on the image data included in the recording command (step S7). If it is determined that the ink of the four colors is not discharged to at least the adjacent area to any of the parts P1 (step S7: No), then the CPU 91 sets the predetermined time based on the discharge amount to each of the parts P1, and the conveyance time for the conveyer 50 to convey the paper P from each of the parts P1 to the rollers 51*a* (step S8). The conveyance time for the conveyer 50 to convey the paper P from each part P1 to the roller 51*a* is calculated based on the distance D from each part P1 to the roller 51*a* in the conveyance direction and the conveying speed for the conveyer 50 to convey the paper P. In this manner, the predetermined time is set for each part P1. After the step S8, the CPU 91 determines whether or not the predetermined time set for each part P1 has elapsed since the end time of the recording process on the part P1 (step S9). If the CPU 91 determines that the predetermined time for all parts P1 has elapsed (step S9: Yes), then the process proceeds to the step S10.

If the CPU 91 groups the rollers 51*a* (the parts P1) according to the program of FIG. 11 (step S22), then in the steps S5 to S9 of the program of FIG. 5, the processes are carried out for each of the groups X1 and X2 with the grouped parts P1. The CPU 91 carries out the processes for each of the parts P1 which are not grouped.

In particular, in the step S5, the CPU 91 determines whether or not the discharge amount to each of the parts P1 which are not grouped or to each of the groups X1 and X2 where the parts P1 are grouped exceeds the threshold value. If the discharge amount to any one of the parts P1, the group X1 and the group X2; any two of the parts P1, the group X1 and the group X2; or all of the parts P1, the group X1 and the group X2 exceeds the threshold value (step S5: Yes), then the CPU 91 determines whether or not an adjacent area is brighter than each of the parts P1 (step S6). Then, the CPU 91 determines whether or not the adjacent area is brighter than each of the groups X1 and X2 where the parts P1 are grouped (step S6). The adjacent area is defined in the same manner as that described earlier on. If at least one adjacent area to a part P1 or one of the groups X1 and X2 is determined brighter than the corresponding part P1 or one of the groups X1 and X2 (step S6: Yes), then the CPU 91 determines whether or not the ink of the four colors of cyan, magenta, yellow and black is discharged to the adjacent area, based on the image data included in the recording command (step S7). If it is determined that the ink of the four colors is not discharged to any one of the adjacent areas to the parts P1, the group X1 and the group X2; any two of the adjacent areas to the parts P1, the group X1 and the group X2; or all of the adjacent areas to the parts P1, the group X1 and the group X2 (step S7: No), then the CPU 91 sets the predetermined time based on the discharge amount to each of the parts P1 or the groups X1 and X2, and the conveyance time for the conveyer 50 to convey the paper P from each of the parts P1 or the groups X1 and X2 to the rollers 51*a* (step S8). The conveyance time for the conveyer 50 to convey the paper P from each of the parts P1 or the groups X1 and X2 to the roller 51*a* is calculated based on the distance D from each of the parts P1 or the groups X1 and X2 to the roller 51*a* in the conveyance direction and the conveying speed for the conveyer 50 to convey the paper P. In this manner, the predetermined time is set for each of the parts P1 or the groups X1 and X2. After the step S8, the CPU 91 determines whether or not the predetermined time set for each of the parts P1 or the groups X1 and X2 has elapsed since the end time of the recording process on the part P1 or the one of the groups X1 and X2 (step S9). If the CPU 91 determines that the predetermined time for all parts P1 and the groups X1 and X2 has elapsed (step S9: Yes), then the process proceeds to the step S10.

Note that the paper P is inclined to give rise to an upward rollback in the end part according to the main moving direction, such that the ink becomes more likely to attach to the rollers 51*a*, Therefore, in the fifth embodiment, the rollers 51*a* in the vicinity of the end part in the main moving direction are excluded from the group, so as to determine for each part P1 without grouping even if the length of the paper P in the main moving direction is equal to or larger than the predetermined length.

As described above, according to the fifth embodiment, by carrying out the steps S5 to S9 for each of the groups X1 and X2 corresponding to the roller groups G1 and G2, it is possible to simplify each process compared to the case of carrying out the steps S5 to S9 for each part P1 corresponding to one roller 51*a*. By virtue of this, it is possible to downsize the control circuit whereby it is possible to lower the cost for the control circuit.

If the paper P has larger length in the main moving direction than the predetermined length, then the CPU 91 carries out the steps S5 to S9 for each of the groups X1 and X2 corresponding to the roller groups G1 and G2. If the paper P has larger length in the main moving direction than the predetermined length, then the number of rollers 51*a* increases in contact with the paper P such that the number of parts P1 also increases in correspondence with the rollers 51*a*. Therefore, the steps S5 to S9 may become complicated. In the fifth embodiment, the steps S5 to S9 are carried out for each of the groups X1 and X2 corresponding to the roller groups G1 and G2 in the above manner. By virtue of this, it is possible to effectively prevent the complication of the steps S5 to S9.

Modified Embodiments

Hereinabove, the preferred embodiments of the present disclosure are explained. However, the present disclosure is not limited to the above embodiments but, without departing from the scope set forth in the appended claims, various changes in design are possible.

For example, in the above embodiments, the threshold value differs according to the ink color (the color agent being the ink component). However, the present disclosure is not limited to that aspect, but the threshold value may be the same for all four colors.

In the above embodiments, the predetermined time is set based on the ink color (the color agent being the ink component). However, the present disclosure is not limited to that aspect, but the predetermined time may be set based on all four colors.

In the above embodiments, the first determining process determines whether or not the predetermined time has elapsed since the "end point of the recording process". However, the present disclosure is not limited to that aspect, but it is possible to determine whether or not the predetermined time has elapsed since an arbitrary point of the recording process (such as the start point of the recording process).

Figure 12:
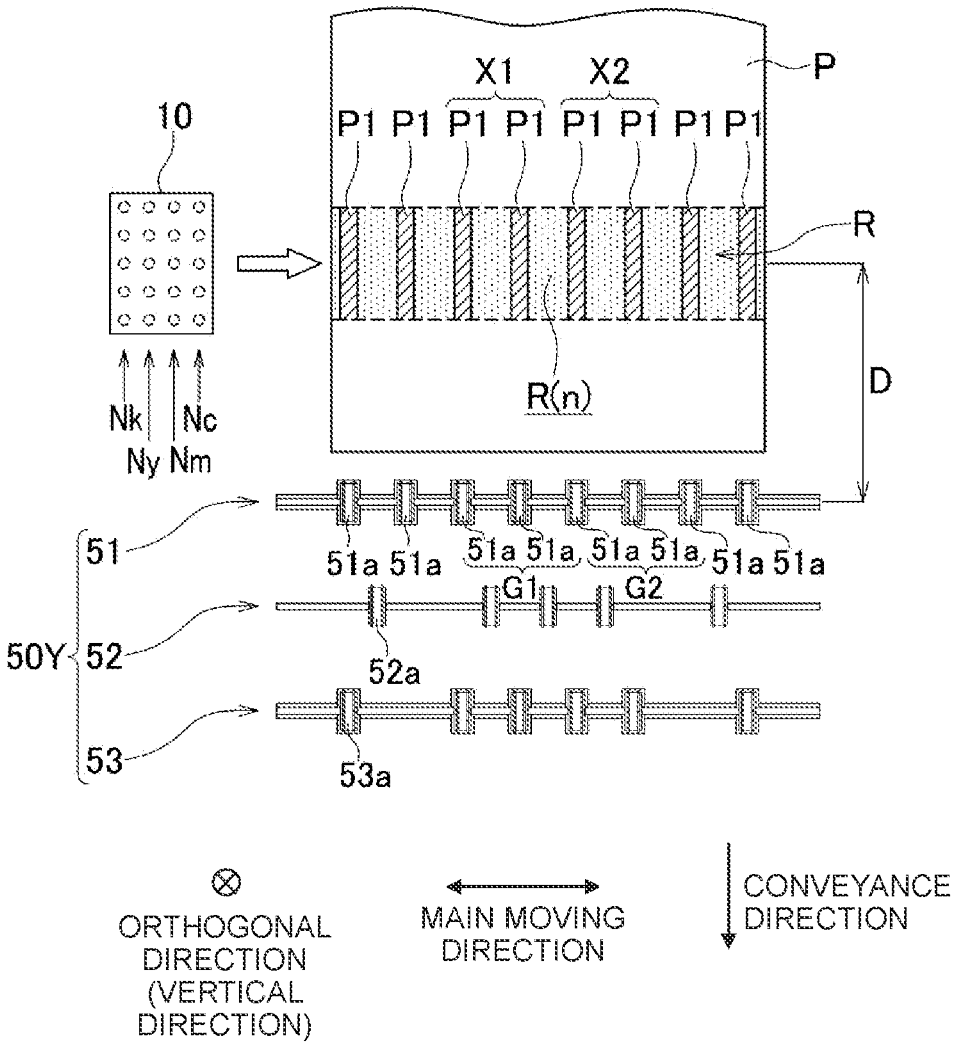
FIG. 12 depicts a schematic view for explaining a setting method for a predetermined time.

In the above embodiments, the conveyance distance from the recording area to the rollers is exemplified to be the distance between the centers of the recording area and the rollers (the distance D of FIG. 6, the distances D1 to D3 of FIG. 8, the distances D1*a* and D1*b* of FIG. 10, and the distance I) of FIG. 12). However, the present disclosure is not limited to that aspect but, for example, the conveyance distance from the recording area to the rollers may be the distance from the upstream end of the recording area in the conveyance direction to the upstream end of the rollers in the conveyance direction, the distance from the downstream end of the recording area in the conveyance direction to the downstream end of the rollers in the conveyance direction, the distance from the downstream end of the recording area in the conveyance direction to the upstream end of the rollers in the conveyance direction, the distance from the upstream end of the recording area in the conveyance direction to the downstream end of the rollers in the conveyance direction, or the like.

In the fifth embodiment (FIG. 10), the part P1 is divided into the two parts P1*a* and P1*b*. However, the present disclosure is not limited to that aspect, but the part P1 may be divided into three or more parts. Further, in the fifth embodiment, the part P1 is divided into the upstream part P1*a* and the downstream part P1*b*. However, the present disclosure is not limited to that aspect, but the moving area R (n) may be divided into an upstream part and a downstream part.

In the sixth embodiment (FIG. 12), the explanation is made with the example of grouping the parts P1 corresponding to the rollers 51*a*. However, the present disclosure is not limited to that aspect, but it is possible to group the parts corresponding to the other rollers 52*a* and 53*a*. Further, in the fifth embodiment, the rollers 51*a* in the vicinity of the end in the main moving direction are excluded from the group. However, the present disclosure is not limited to that aspect, but all rollers 51*a* may be grouped.

The rollers according to the present disclosure are not limited to spur rollers but may be rollers without projections formed on the outer circumferential surfaces.

The head may be of a line type albeit being a serial type in the above embodiments.

The liquid discharged from the nozzles is not limited to an ink but may be a liquid other than an ink (for example, a processing liquid or the like agglutinating or segregating the components of the ink).

The medium is not limited to paper but may be, for example, cloth, a resin product, or the like.

The present disclosure is applicable to facsimile machines, photocopiers, multifunction machines and the like but not limited to application to printers. Further, the present disclosure is also applicable to liquid discharge apparatuses used for other purposes than recording images (such as liquid discharge apparatuses forming electrically conductive patterns by discharging an electrically conductive liquid to a substrate).

What is claimed is:

1. A liquid discharge apparatus comprising:
- a head including a nozzle surface having a plurality of nozzles;
- a conveyer configured to convey a medium in a conveyance direction, including a roller located at a downstream of the head in the conveyance direction; and
- a controller configured to perform:
  - as a recording process, controlling the head to discharge liquid from the plurality of nozzles onto a recording area of the medium;
  - as a first determining process, determining whether or not a predetermined time has elapsed since the recording process;
  - as a conveying process, controlling the conveyer to convey the medium in the conveyance direction in a case that the controller determines that the predetermined time has elapsed in the first determining process; and
  - as a setting process, setting the predetermined time based on a discharge amount of the liquid from the plurality of nozzles onto the recording area of the medium and a conveyance time for the conveyer to convey the medium from the recording area to the roller, before the first determining process.

2. The liquid discharge apparatus according to claim 1, wherein the controller is configured to perform:
- as a second determining process, determining whether or not the discharge amount exceeds a threshold value, and
- wherein the controller is configured to perform the setting process and the first determining process in a case that the controller determines that the discharge amount exceeds the threshold value in the second determining process.

3. The liquid discharge apparatus according to claim 2, wherein the threshold value differs according to a component of the liquid discharged from the plurality of nozzles onto the recording area.

4. The liquid discharge apparatus according to claim 1, wherein in the setting process, the controller is configured to set the predetermined time based on a component of the liquid discharged from the plurality of nozzles onto the recording area.

5. The liquid discharge apparatus according to claim 1, wherein the recording area is part of the medium, extending in a main moving direction intersecting with the conveyance direction and parallel to the nozzle surface.

6. The liquid discharge apparatus according to claim 1, wherein the recording area is an area, of the medium, extending in a main moving direction intersecting with the conveyance direction and parallel to the nozzle surface, the area facing the roller in an orthogonal direction orthogonal to the nozzle surface in a case that the medium is conveyed in the conveyance direction.

7. The liquid discharge apparatus according to claim 6, wherein the roller includes a first roller and a second roller,
- wherein a contact point of the first roller with the medium is different from a contact point of the second roller with the medium in the orthogonal direction and,
- wherein in the setting process, the controller is configured to set the predetermined time corresponding to the first roller based on a position of the contact point of the first roller in the orthogonal direction and the predetermined time corresponding to the second roller based on a position of the contact point of the second roller in the orthogonal direction.

8. The liquid discharge apparatus according to claim 6, wherein the roller includes a first roller a second roller,
- wherein a material of the first roller is different from a material of the second roller, and
- wherein in the setting process, the controller is configured to set the predetermined time corresponding to the first roller based on the material of the first roller and the predetermined time corresponding to the second roller based on the material of the second roller.

9. The liquid discharge apparatus according to claim 2, wherein the roller includes a first roller and a second roller,
- wherein a contact point of the first roller with the medium is different from a contact point of the second roller with the medium in an orthogonal direction orthogonal to the nozzle surface,
- wherein the recording area is an area of the medium, extending in a main moving direction intersecting with the conveyance direction and parallel to the nozzle surface, the area including a first area facing the first roller in the orthogonal direction in a case that the medium is conveyed in the conveyance direction and a second area facing the second roller in the orthogonal direction in a case that the medium is conveyed in the conveyance direction,
- wherein the threshold value includes a first threshold value and a second threshold value,
- wherein the controller is configured to determine whether or not one of a first condition, a second condition or both the first condition and the second condition is met in the second determining process, the first condition being a condition in which the discharge amount to the first area exceeds the first threshold value, and the second condition being a condition in which the discharge amount to the second area exceeds the second threshold value, and
- wherein the first threshold value differs from the second threshold value according to positions of the contact point of the first roller and the contact point of the second roller in the orthogonal direction.

10. The liquid discharge apparatus according to claim 2, wherein the roller includes a first roller and a second roller, wherein a material of the first roller is different from a material of the second roller, wherein the recording area is an area of the medium, extending in a main moving direction intersecting with the conveyance direction and parallel to the nozzle surface, the area including a first area facing the first roller in an orthogonal direction orthogonal to the nozzle surface in a case that the medium is conveyed in the conveyance direction and a second area facing the second roller in the orthogonal direction in a case that the medium is conveyed in the conveyance direction, wherein the threshold value includes a first threshold value and a second threshold value, wherein the controller is configured to determine whether or not one of a first condition, a second condition or both the first condition and the second condition is met in the second determining process, the first condition being a condition in which the discharge amount to the first area exceeds the first threshold value, and the second condition being a condition in which the discharge amount to the second area exceeds the second threshold value, and wherein the first threshold value differs from the second threshold value according to the material of the first roller and the material of the second roller.

11. The liquid discharge apparatus according to claim 1, wherein the recording area includes an upstream part and a downstream part positioned at the downstream of the upstream part in the conveyance direction, and wherein in the setting process, the controller is configured to determine a first predetermined time as the predetermined time based on the discharge amount to the upstream part and the conveyance time from the upstream part to the roller, and a second predetermined time as the predetermined time based on the discharge amount to the downstream part and the conveyance time from the downstream part to the roller.

12. The liquid discharge apparatus according to claim 2, wherein the recording area includes an upstream part and a downstream part positioned at the downstream of the upstream part in the conveyance direction, and wherein in the second determining process, the controller is configured to determine whether or not one of the discharge amount to the upstream part exceeds the threshold value, the discharge amount to the downstream part exceeds the threshold value or both the discharge amount to the upstream part and the discharge amount to the downstream part exceed the threshold value.

13. The liquid discharge apparatus according to claim 6, wherein the conveyer includes a plurality of roller groups including a plurality of rollers aligned in a main moving direction intersecting with the conveyance direction and parallel to the nozzle surface, the roller being included in the plurality of rollers, and wherein in the setting process, the controller is configured to set the predetermined time for each of the plurality of roller groups.

14. The liquid discharge apparatus according to claim 2, wherein the conveyer includes a plurality of roller groups including a plurality of rollers aligned in a main moving direction intersecting with the conveyance direction and parallel to the nozzle surface, the roller being included in the plurality of rollers, and wherein the recording area is an area of the medium, extending in a main moving direction intersecting with the conveyance direction and parallel to the nozzle surface, the area including a plurality of areas facing the plurality of rollers in an orthogonal direction orthogonal to the nozzle surface in a case that the medium is conveyed in the conveyance direction, wherein in the second determining process, the controller is configured to determine whether or not the discharge amount exceeds the threshold value in one of the plurality of areas.

15. The liquid discharge apparatus according to claim 13, wherein the controller is configured to determine whether or not the medium has a larger length in the main moving direction than a predetermined length, and wherein the controller is configured to determine the predetermined time for each of the plurality of roller groups in the setting process, in the case of the medium having a lamer length in the main moving direction than a predetermined length.

16. The liquid discharge apparatus according to claim 14, wherein the controller is configured to determine whether or not the medium has a larger length in the main moving direction than a predetermined length, and wherein the controller is configured to determine whether or not the discharge amount exceeds the threshold value in one of the plurality of areas in the second determining process, in the case of the medium having a larger length in the main moving direction than a predetermined length.

17. The liquid discharge apparatus according to claim 1, wherein the medium further includes an adjacent area being adjacent to the recording area and at the upstream of the recording area in the conveyance direction, wherein the controller is configured to perform, as a third determining process, determining whether or not the adjacent area is brighter than the recording area, and wherein the controller is configured to perform the setting process and the first determining process in the case of having determined in the third determining process that the adjacent area is brighter than the recording area.

18. The liquid discharge apparatus according to claim 1, wherein the medium further includes an adjacent area being adjacent to the recording area and on the upstream of the recording area in the conveyance direction, wherein the controller is configured to perform, as a fourth determining process, determining whether or not the liquid in four colors is discharged to the adjacent area, the four colors being cyan, magenta, yellow, and black, and wherein the controller is configured to perform the setting process and the first determining process in the case of having determined in the fourth determining process that the liquid in the four colors is not discharged to the adjacent area.

19. The liquid discharge apparatus according to claim 1, wherein the conveying process includes a first conveying process to convey the medium through a first distance, and a second conveying process to convey the medium through a second distance longer than the first distance, wherein the controller is configured to repetitively perform a series of processes including a first recording process as the recording process, the first conveying process after the first recording process, a second recording process as the recording process after the first conveying process, and the second conveying process after the second recording process, wherein in the series of processes, the recording area of the first recording process overlaps in part with the recording area of the second recording process, wherein the recording area of the first recording process in the series of processes does not overlap with the recording area of the first recording process in a next process in the series of processes, and wherein the controller is configured to perform, in the series of processes, the setting process and the first determining process after the second recording process but before the second conveying process.

* * * * *